United States Patent [19]
Ashida et al.

[11] Patent Number: 5,206,721
[45] Date of Patent: Apr. 27, 1993

[54] TELEVISION CONFERENCE SYSTEM

[75] Inventors: Youichi Ashida, Kawasaki; Ryusaku Imai, Yamato; Yuji Yoshida; Toshihiro Homma, both of Yokohama; Hitoshi Sato, Tokyo; Hitoshi Ishiguro, Inagi; Hiroaki Natori, Kawasaki; Masakazu Yamaguchi, Kawasaki, all of Japan

[73] Assignee: Fujitsu Limited, Kawasaki, Japan

[21] Appl. No.: 490,469

[22] Filed: Mar. 8, 1990

[51] Int. Cl.$^5$ .................... H04N 7/12; H04M 11/00
[52] U.S. Cl. .......................... 358/85; 379/54; 379/202; 379/206
[58] Field of Search ............... 379/54, 53, 202, 206; 358/85; 370/62

[56] References Cited

U.S. PATENT DOCUMENTS 3,944,736 3/1976 Shepard .......................... 379/54
4,054,908 10/1977 Poirier et al. .................... 379/54

FOREIGN PATENT DOCUMENTS 1-109908 4/1989 Japan .

OTHER PUBLICATIONS

Bernard A. Wright, "The Design of Picturephone® Meeting Service (PMS) Conferencing Centers For Video Teleconferencing", IEEE Communications Magazine, pp. 30–36, 1983.

Primary Examiner—James L. Dwyer
Assistant Examiner—Wing F. Chan
Attorney, Agent, or Firm—Staas & Halsey

[57] ABSTRACT

A television conference system having at least one of the functions of automatically directing a camera toward a speaker, of transmitting video signals of picture images from a plurality of television cameras, and of displaying a document image. The television conference system includes a microphone input judgement unit for judging the existence of any input into microphones provided for the speakers of a television conference; a judgement result holding unit for holding the results of the judgement of existence of the microphone inputs over a first predetermined period, the first predetermined period being longer than the shortest period of continuous speaking; a time totaling unit for obtaining the total time of the microphone inputs during the first predetermined period from the results of judgement held in the judgement result holding unit; a speaker specifying unit for specifying as the current speaker the speaker using a microphone having a total time obtained by the time totaling unit which is over a second predetermined period, the second predetermined period being the standard continuing period of noise; and a camera drive unit for driving a camera within a shooting range of the speaker specified as the current speaker by the speaker specifying unit.

33 Claims, 37 Drawing Sheets

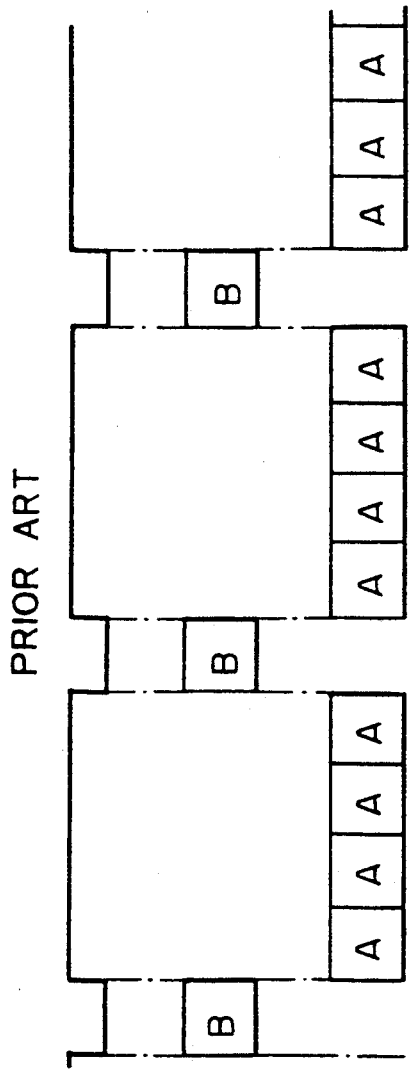
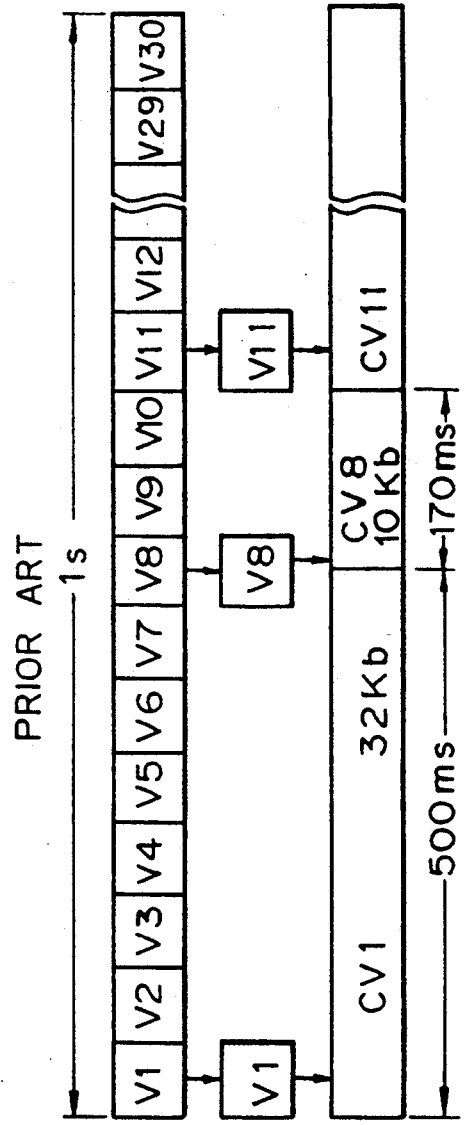
Fig. 10A
Fig. 10B
Fig. 10C
Fig. 11A
Fig. 11B
Fig. 11C

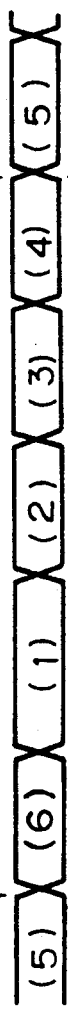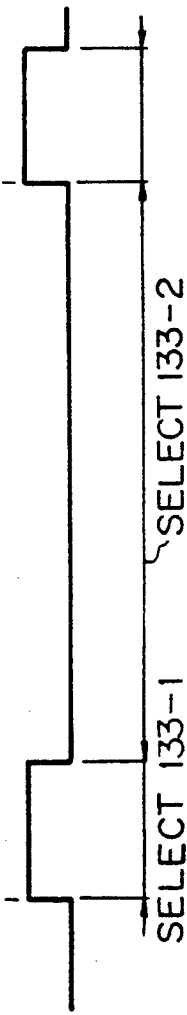
Fig. 16A
Fig. 16B
Fig. 16C

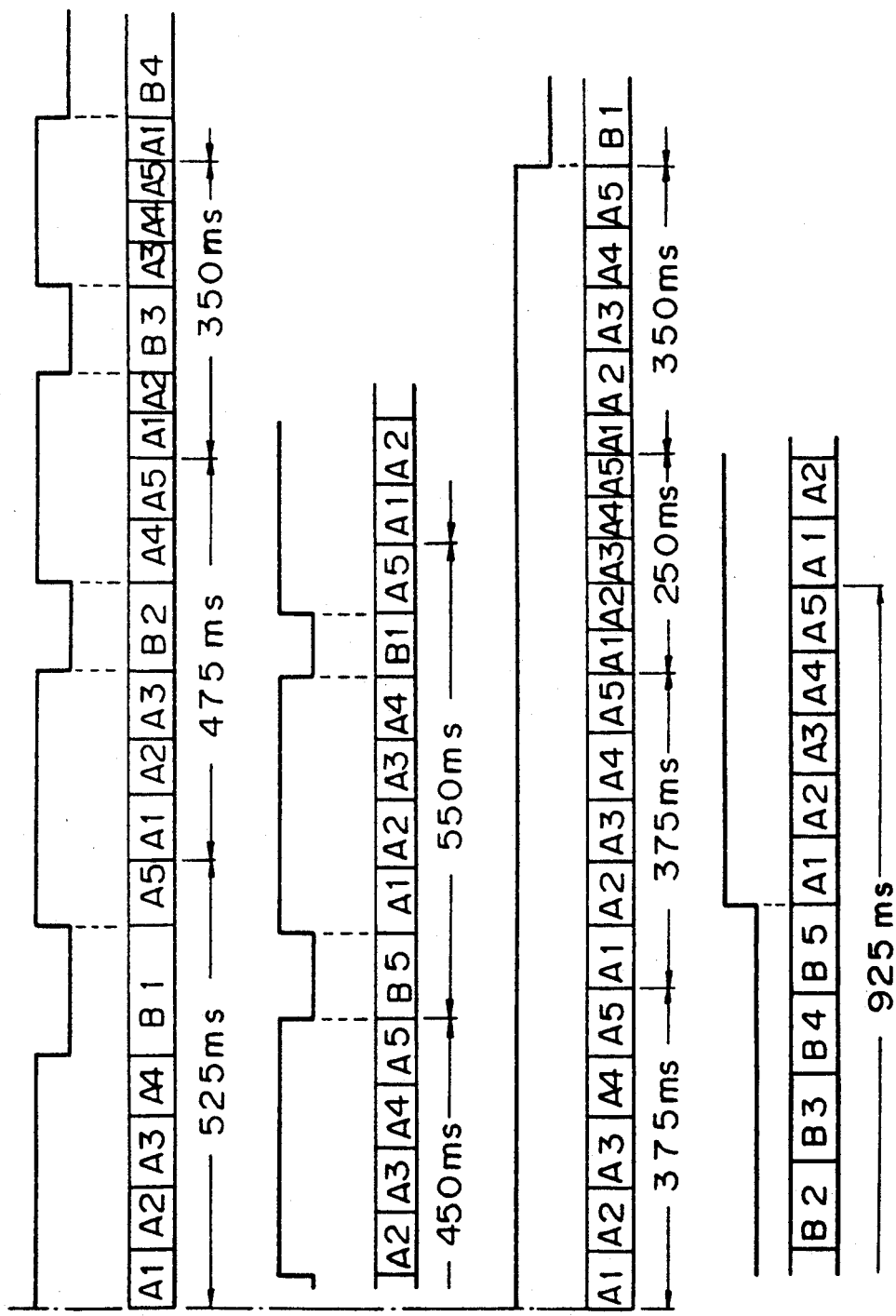

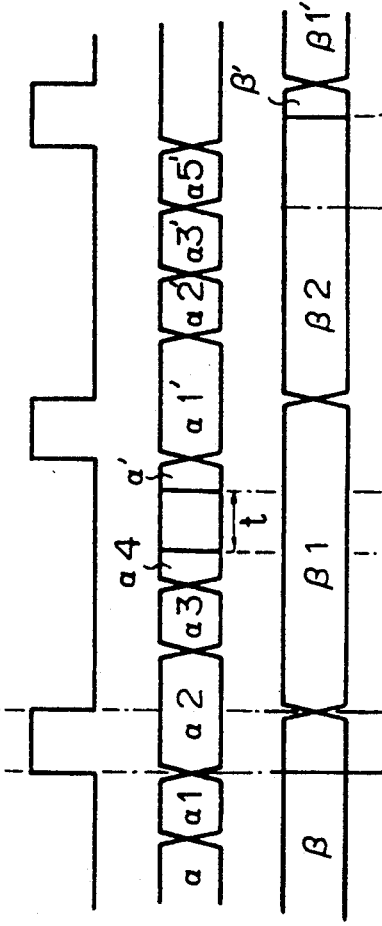

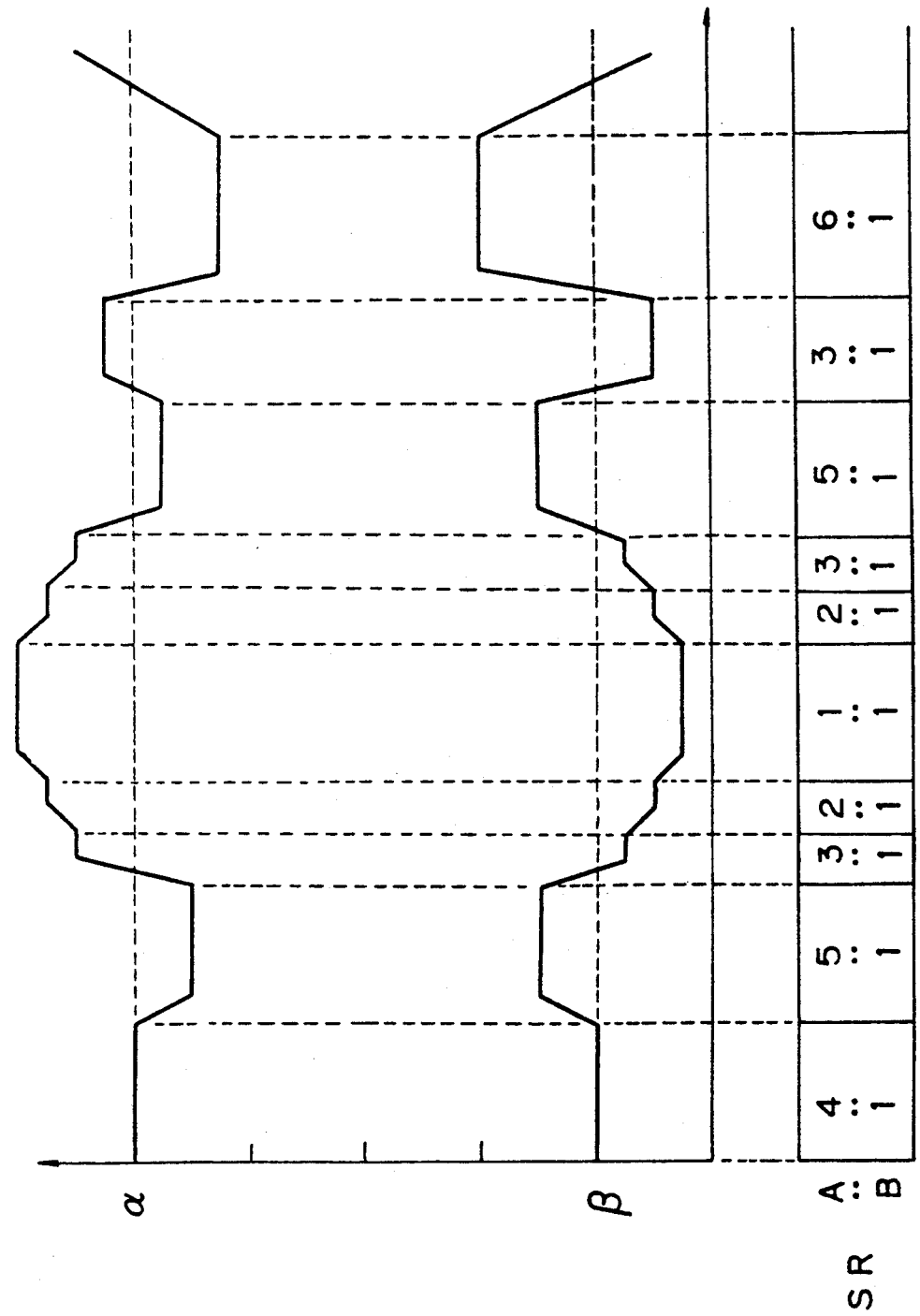

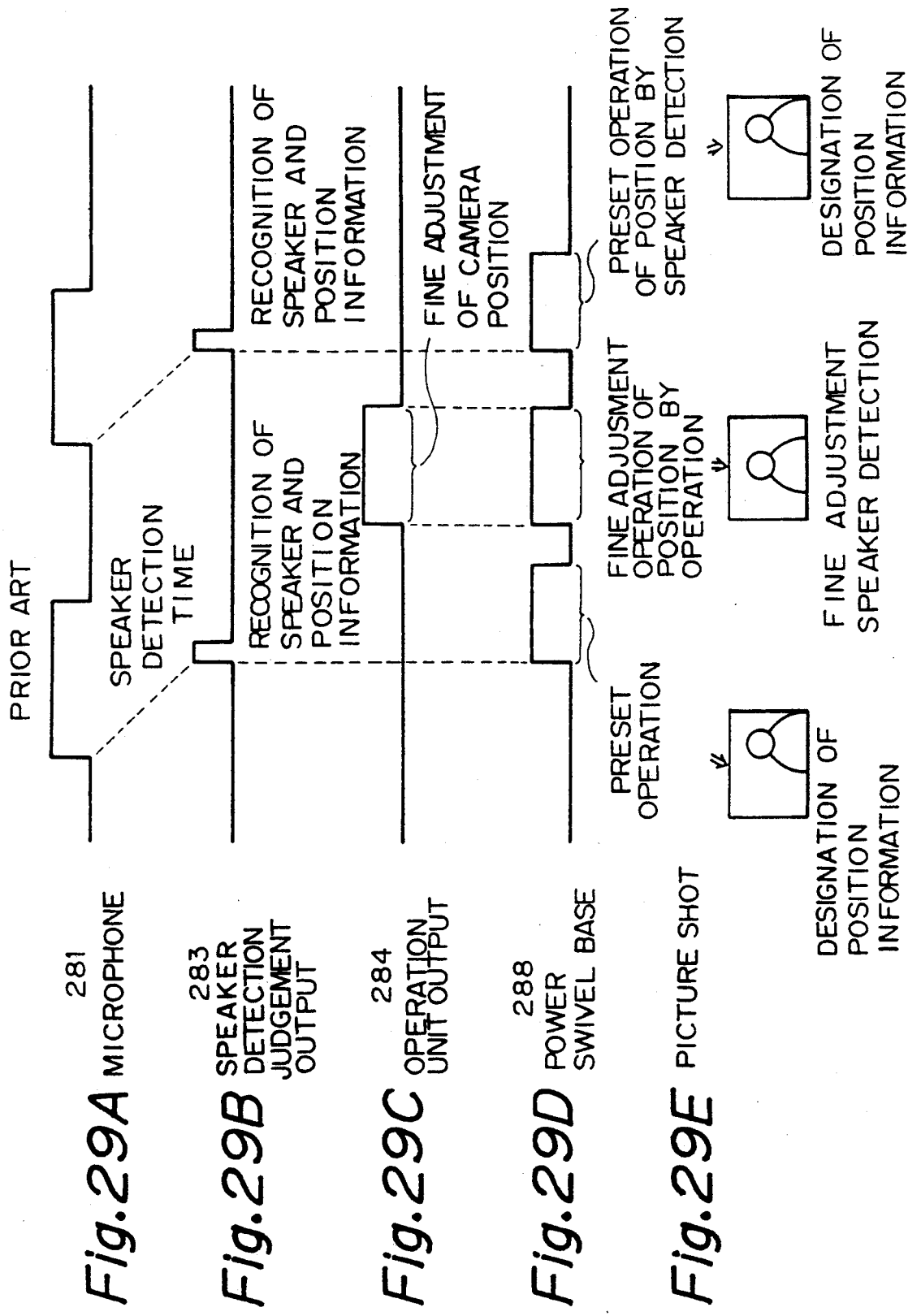

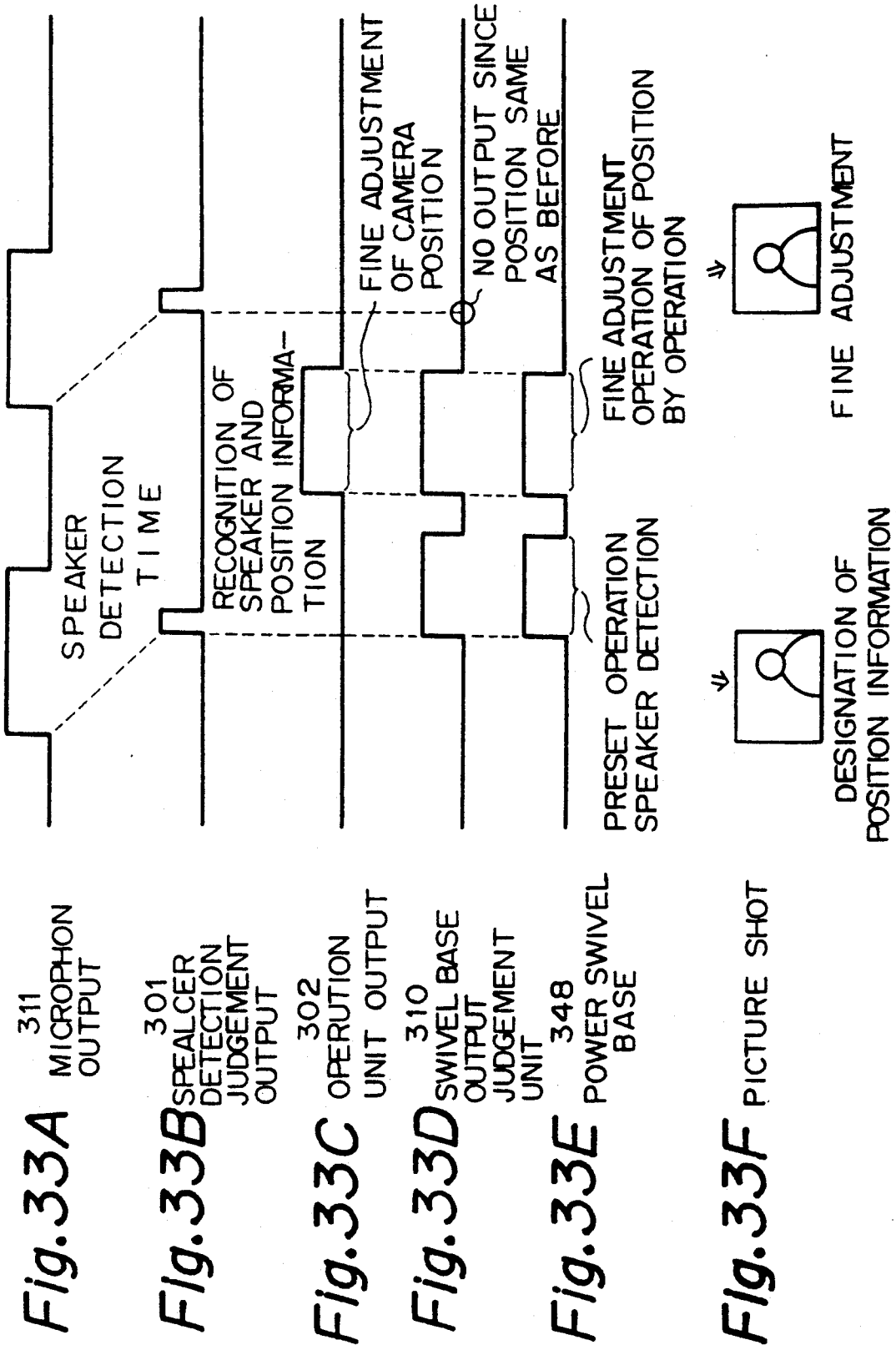

TELEVISION CONFERENCE SYSTEM

BACKGROUND OF THE INVENTION (1) Field of the Invention

The present invention relates to a television conference system having at least one of the functions of automatically shooting a speaker, of transmitting video signals of picture images from a plurality of television cameras, and of displaying a document image. More particularly, it relates to an improvement of a television conference system in the automatic shooting of a speaker, in a multipicture transmission, or in a document image display.

(2) Description of the Related Arts

In a conventional television conference system, the speaker currently speaking is not automatically selected from among the participants as the subject of the camera.

In a conventional television conference system also, multipicture transmission of moving images is effected by dropping a number of image pictures when the transmission speed is low.

Further, in a conventional television conference system, the document image displayed on the monitor at the transmission station is too small to view.

SUMMARY OF THE INVENTION

An object of the present invention is to provide a television conference system with a high precision of specification of speakers and that is free from the influence of noise.

Another object of the present invention is to provide a television conference system which enables display of a moving image even in the transmission of multiple pictures.

Still another object of the present invention is to provide a television conference system in which document images can be clearly monitored even at a transmitting station.

Still another object of the present invention is to provide a television conference system in which it is possible to simultaneously display the group atmosphere of the conference room and the expressions of the participants, and it is possible to give the impression of a normal conference.

To attain the above objects, there is provided, according to the present invention, a television conference system having at least one of the functions of automatically shooting a speaker, of transmitting video signals of picture images from a plurality of television cameras, and of displaying a document image. The system includes a microphone input judgement unit for judging the existence of any input to microphones provided for the speakers of a television conference; a judgement result holding unit for holding the results of the judgement of existence of the microphone inputs over a first predetermined period, the first predetermined period being longer than the shortest period of continuous speaking; a time totaling unit for obtaining the total time of the microphone inputs during the first predetermined period from the results of a judgement held in the judgement result holding unit; a speaker specifying unit for specifying as the current speaker the speaker using a microphone having a total time obtained by the time totaling means which is over a second predetermined period, the second predetermined period being the standard continuing period of a noise; and a camera drive unit for driving one of a plurality of cameras within a shooting range of the speaker specified as the current speaker by the speaker specifying unit.

According to another aspect of the present invention, there is provided a television conference system having at least one of the functions of automatically shooting a speaker, of transmitting video signals of picture images from a plurality of television cameras, and of displaying a document image, including a plurality of television cameras including an overview shooting camera for shooting an overview and a plurality of portion shooting cameras for shooting portions inside said overview; a transmission unit for transmitting video signals obtained by the plurality of television cameras; a reception unit for receiving the video signals from the transmission unit; a combining unit for combining the video signals into one picture image; and a display unit for displaying the combined result; the transmission unit having a selecting unit for selecting video signals to be transmitted by dividing the video signals from the plurality of television cameras into a plurality of blocks and by switching between the video signals from the overview shooting camera and the video signals from the portion shooting camera in units of the blocks and in accordance with a predetermined transmission ratio between the video signals to be transmitted from the overview shooting camera and the video signals to be transmitted from the portion shooting camera.

According to still another aspect of the present invention, there is provided a content control unit for blocking position information from said microphone input judgement means when said operation content control unit is operating; and speaker content control means for controlling said signal information from said microphone input judgement means when said operation content control means is not operating.

According to the still another aspect of the present invention, a television conference system is provided having at least one of the functions of automatically shooting a speaker, of transmitting video signals of picture images from a plurality of television cameras, and of displaying a document image, including a moving image camera group; a document shooting camera; a transmission monitor for displaying a transmission image; a reception monitor for displaying a reception image; an image control unit for controlling said transmission monitor and said reception monitor; the image control unit includes a first changeover switch for switching the moving image camera group in one conference room in response to a switching signal from an opposite party conference room; and a second changeover switch for switching in response to a switching signal from the transmitting conference room so that an image from said document camera is displayed on said reception monitor in said opposite party conference room and on said reception monitor in said transmitting conference room, and the image from the opposite party conference room is not displayed on said reception monitor in the transmitting conference room.

BRIEF DESCRIPTION OF THE DRAWINGS

The above objects and features of the present invention will be more apparent from the following description of the preferred embodiments with reference to the drawings: wherein

FIGS. 10A to 10C are diagrams for explaining the operation of the system shown in FIG. 9;

FIGS. 11A to 11C are diagrams for explaining data compression;

FIGS. 16A to 16C are diagrams for explaining the operation of the selector control unit shown in FIG. 15;

FIGS. 17A to 17H are diagrams for explaining the transmission by the system shown in FIG. 13;

FIGS. 20A to 20G are diagrams for explaining the operation of the ratio control portion shown in FIG. 18;

FIG. 21 is a diagram for explaining the change of set ratio;

FIGS. 29A to 29E are diagrams for explaining the operation of the system shown in FIG. 28A;

FIGS. 33A to 33F are time charts of operation of the system shown in FIG. 30;

DESCRIPTION OF THE PREFERRED EMBODIMENTS

In the following, preferred embodiments of the present invention are described with reference to the drawings and compared with conventional arts.

Figure 1:
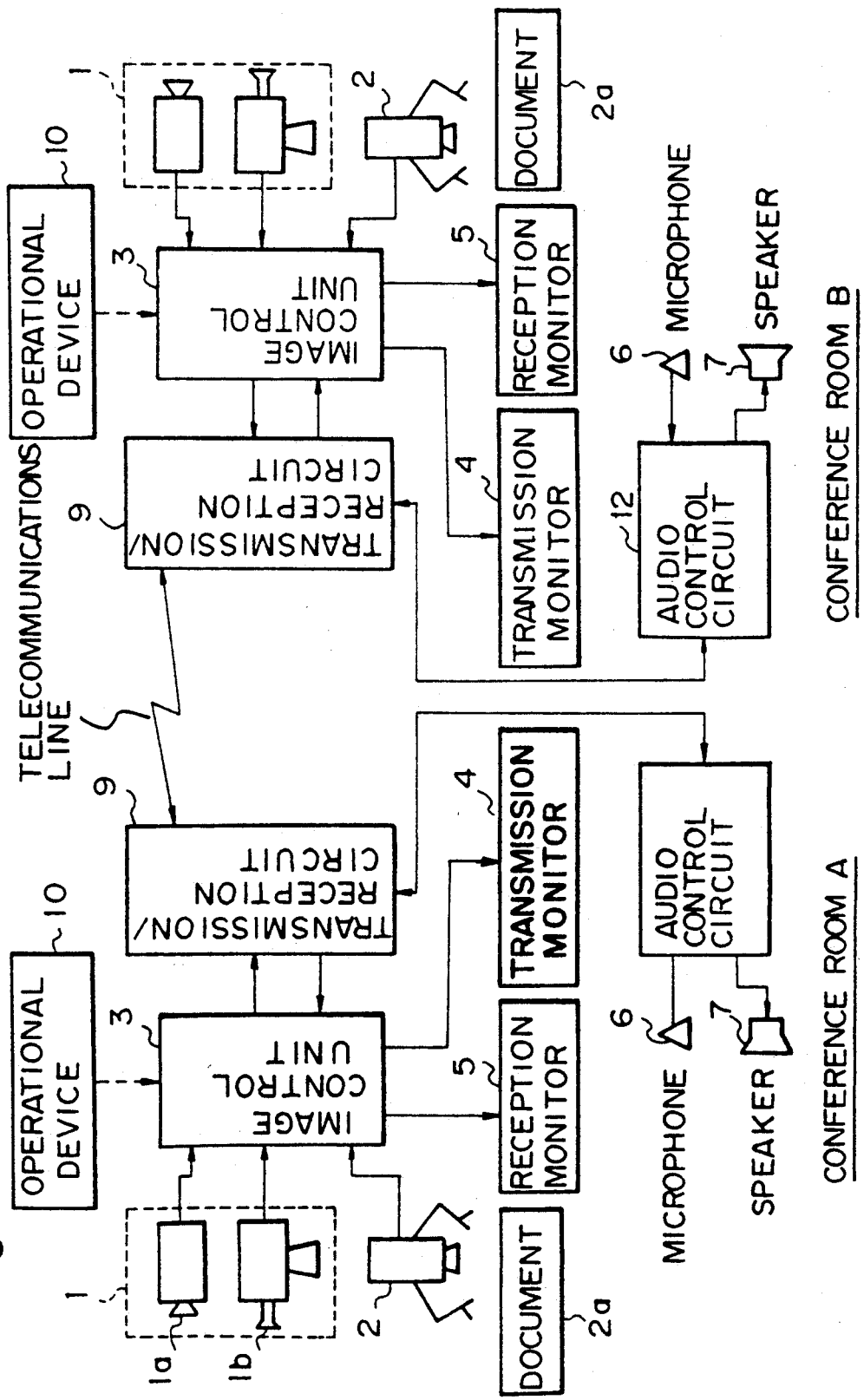
FIG. 1 is a block diagram showing an outline of a general television conference system for explaining the background of the present invention.

FIG. 1 is a block diagram showing an outline of a general television conference system for explaining the background of the present invention. In the figure, in each of conference rooms A and B, 1 is a moving camera group which includes an overview camera 1a which shoots the entire conference room, and a participant camera 1b (including a zoom focus control unit and pan tilt power universal head) which shoots each of the participants, 2 is a document camera which shoots a document 2a, 3 is an image control unit, 4 is a transmission monitor which displays an image transmitted to an opposite conference room, and 5 is a reception monitor which displays an image received from the opposite conference room. It is of course possible to provide a plurality of participant cameras. In addition, for reception of an audio signal, provision is made of a microphone 6, a speaker 7, a transmission/reception circuit 9 and an audio control circuit 12. Further, 10 is an operational device for manual control of the cameras.

In the above system, for example, the moving image camera group 1 of the conference room A is controlled by operating the operational device 10 in the conference room B of the opposite party via the image control unit 3 and transmission/reception circuit 9 of the conference room B and the transmission/reception circuit 9 and image control unit 3 of the conference room A.

Regarding the document camera 2, after the setting of the written document or other document 2a at the transmission side is reported by sound, etc., to the opposite party, the operational device 10 of the conference room B of the opposite party is operated so that the document camera 2 is controlled through the image control unit 3 and the document image is transmitted from the conference room A to the conference room B.

The first embodiment of the present invention relates to an improvement of the image control units and the audio control circuit 12 for driving one of at least one camera to shoot a speaker, wherein the participant who is the current speaker in a television conference is automatically specified and that speaker is shot by the camera.

In a television conference, at least one separate camera is provided in addition to the camera for shooting the overview of the conference room.

The speaker currently speaking is selected from among the participants as the subject of one of the at least one camera. In the conventional system, this selection has been performed by a specific participant (for example, the mediator). However, doing this places a large burden on that participant and invites mistakes.

In this type of system, a microphone is provided for each participant, and the participant whose microphone is recognized to have input is specified as the current speaker. One of the at least one camera for shooting a speaker is driven so that the specified speaker is shot by the camera. Each time the speaker changes, the new speaker is successively shot.

Figure 2:
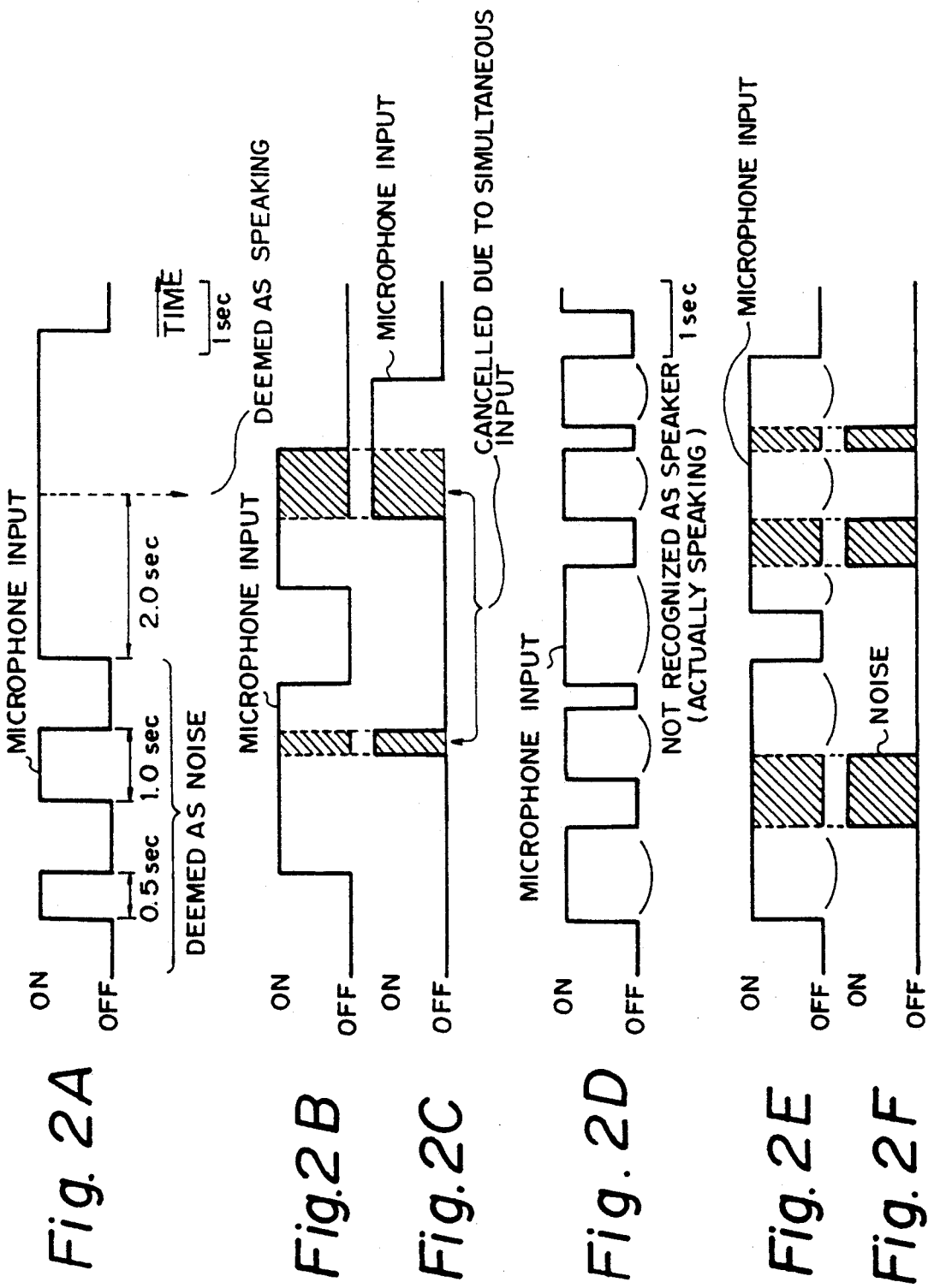
FIGS. 2A to 2F are explanatory views of a conventional speaker recognizing system.

In the conventional art, as shown in FIG. 2A, when a microphone input of over 2 seconds, for example, is recognized, the participant using that microphone is specified as the current speaker. Any microphone input of less than 2 seconds is treated as noise.

Further, as shown in FIGS. 2B and 2C, when two or more speakers are speaking simultaneously, it is deemed that there is no microphone input. Namely, the inputs are cancelled due to the simultaneous inputs.

However, in the conventional art, as shown in FIG. 2D, participants who make statements resulting in intermittent microphone input are not specified as speakers because each speaking period is too short, and therefore there has been a problem in that if a participant breaks off a statement to determine the reaction of other participants, etc., despite having actually made a statement, that participant is not specified as the current speaker.

Furthermore, if noise as shown in FIG. 2F occurs during a statement as shown in FIG. 2E, this noise is deemed as simultaneous input similar to that shown in FIG. 2C and therefore there is a problem that any statement made at that time is ignored and that participant is not specified as the current speaker.

The first embodiment of the present invention is made in view of these problems in the conventional art and has as its object the provision of a high performance system having a high precision of specification of speakers and being free from the influence of noise.

Figure 3:
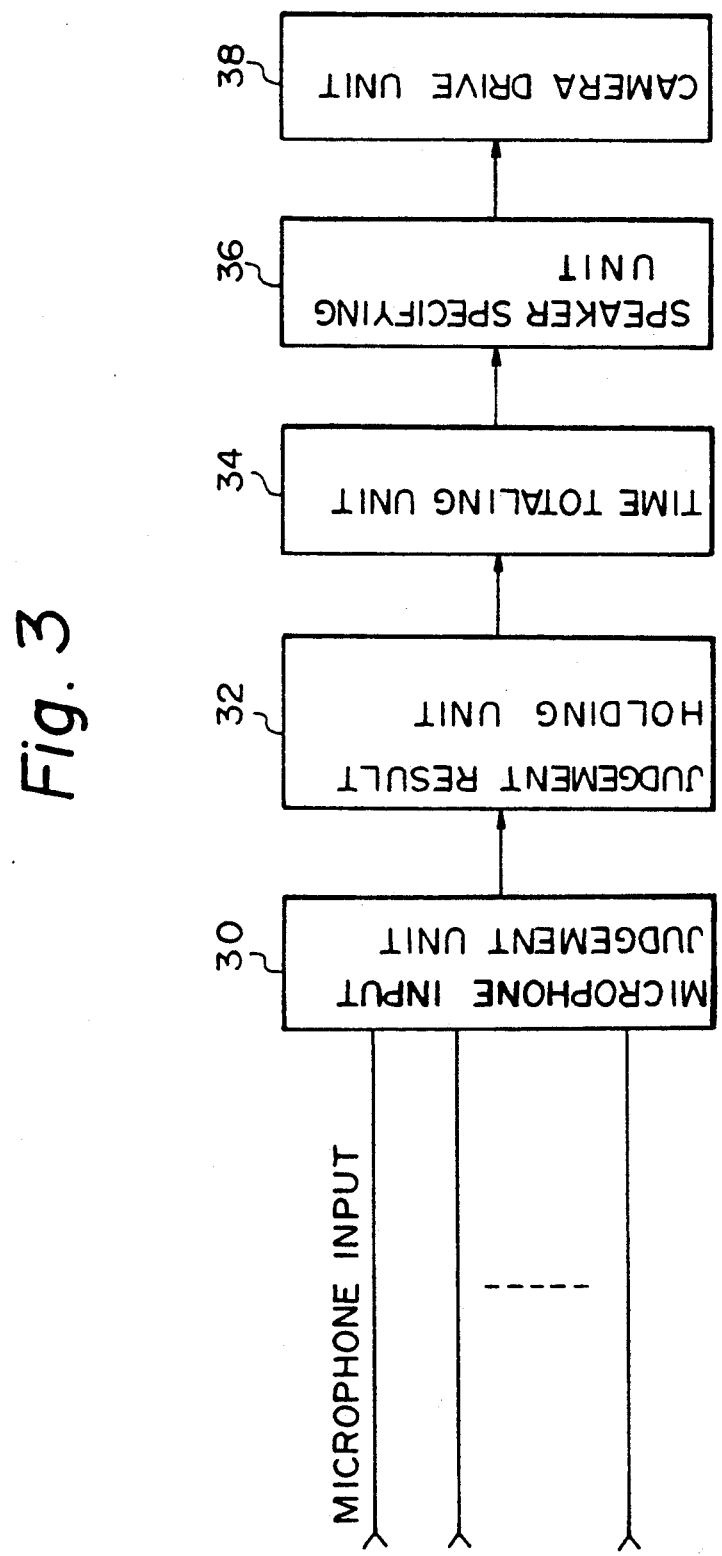
FIG. 3 is a block diagram showing the principle of a first embodiment of the present invention.

To resolve the above-mentioned problems, the apparatus according to the first embodiment of the present invention is constituted as shown in FIG. 3.

In the figure, in a microphone input judgement unit 30, judgement is made based on the existence of input into microphones provided for each speaker of a television conference. In a judgement result holding unit 32, the results of the judgement of the microphone inputs are held for a first period immediately preceding the instant time. The first period is determined to be longer than the shortest period of continuous speaking, and is, for example, approximately 4 seconds.

Further, in a time totaling unit 34, the total time of the microphone inputs during the above-mentioned period is obtained from the result of the judgement being held by the judgement result holding unit 32.

Further, in a speaker specifying unit 36, the speaker using the microphone for which the total time obtained by the time totaling unit 34 is over a second period is specified as the current speaker. The second period is determined to be the standard continuing period of noise, and is, for example, 2 seconds.

A camera drive unit 38 drives the camera in the shooting range of the participant specified as the current speaker by the speaker specifying unit 36.

In operation, the microphone inputs of the first period of approximately 4 seconds are held, and the participant using the microphone for which a total microphone input of over the second period of approximately 2 seconds during the first period is specified as the current speaker.

Below, a more detailed description of the first embodiment will be explained based on the drawings.

Figure 4:
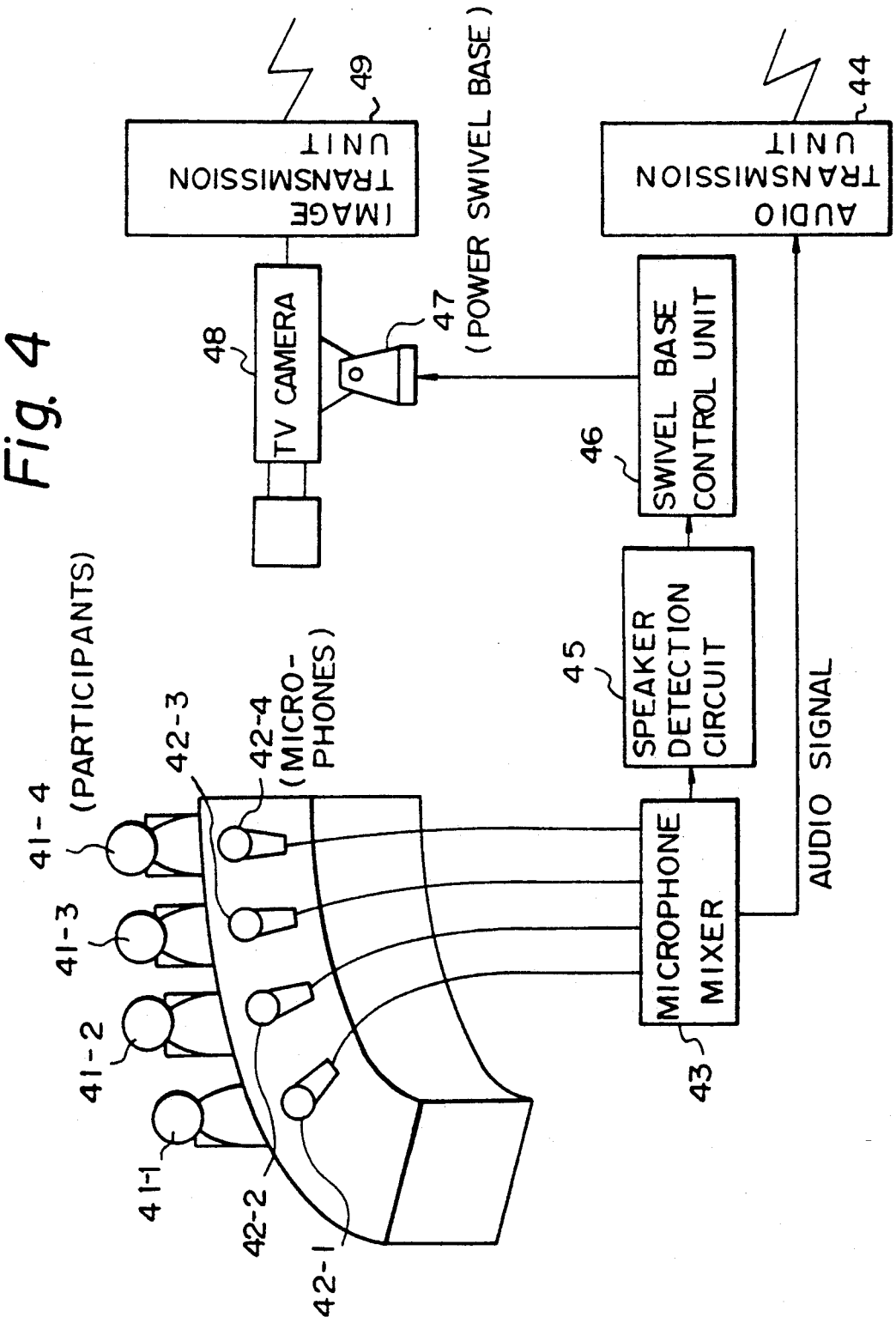
FIG. 4 is a diagram showing the overall constitution of the television conference system according to the first embodiment of the present invention.

FIG. 4 shows an example of a system to which the first embodiment of the present invention is applied. Microphones 42-1, 42-2, 42-3, and 44-4 are provided for the participants 41-1, 41-2, 41-3, and 41-4, respectively, in the television conference.

The audio signals of the microphones 42-1, 42-2, 42-3, and 42-4 are mixed by a microphone mixer 43 to form an audio signal which is applied to an audio transmission unit 44. The audio signal from the microphone mixer 43 is applied to the speaker detection circuit 45, in which the speaker of speaker detection circuit 45 is specified by the audio signal input. Further, the output signal of the speaker detection circuit 45, in which the speaker has been specified, is given to a swivel base control apparatus 46, where the swivel base control apparatus 46 controls the power swivel base 47.

By this, the camera 48 is directed toward the participant 41-1, 41-2, 41-3, or 41-4 which is the speaker specified by the speaker detection circuit 45. If there are a plurality of cameras, the most suitable camera close to the specified speaker is selected to be driven by the swivel base control apparatus 46. Signals containing the image of the speaker are sent from the camera 48 to an image transmission apparatus 49.

Figure 5:
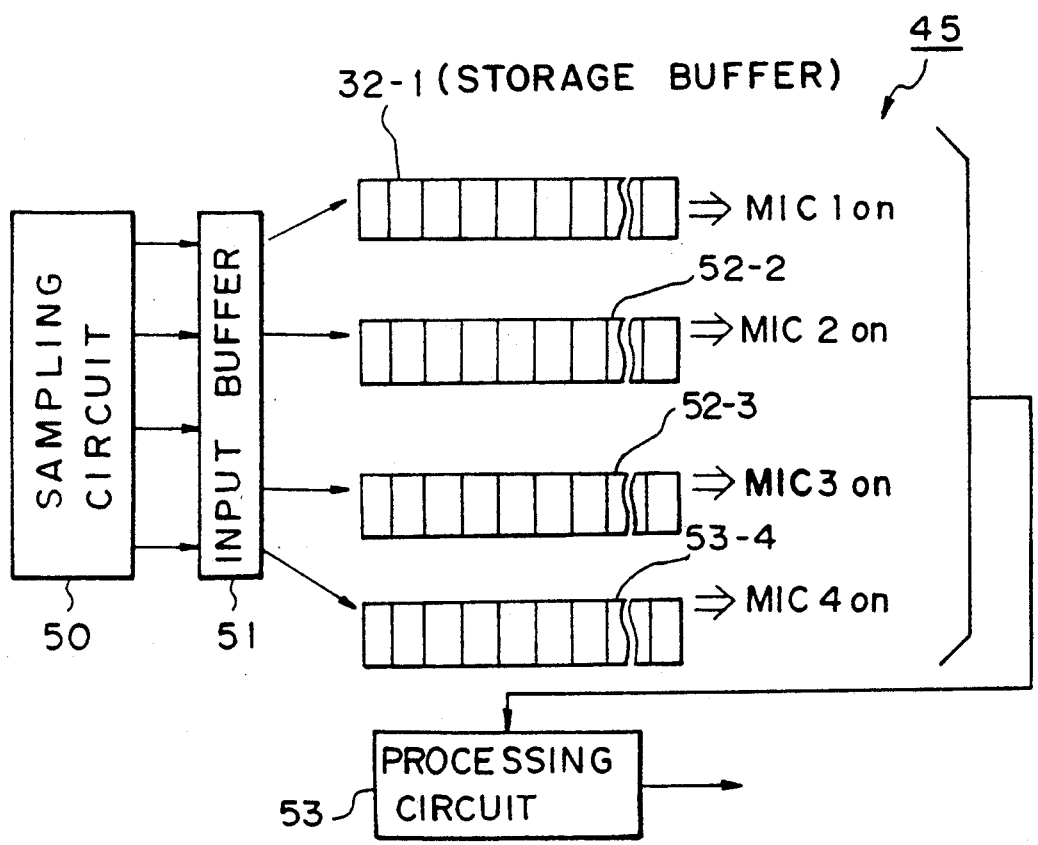
FIG. 5 is a diagram showing the constitution of a speaker detection circuit in the television conference system according to the present invention.

FIG. 5 shows the constitution of the speaker detection circuit 45. The audio signals from the microphones 42-1, 42-2, 42-3, and 42-4 are input through the microphone mixer 43 to a sampling circuit 50.

In the sampling circuit 50, the levels of the audio signals from the microphone mixer 43 are compared with a predetermined level to obtain digital signals corresponding to the microphones 42-1, 42-2, 42-3, and 42-4, respectively. Each of the digital signals is "1" when the audio signal is above a predetermined value and is "0" when below the predetermined level. Thus, the digital signals represent the existence of any input to the microphones. The values of these digital signals are sampled at a predetermined sampling frequency and are input into an input buffer 51.

In the input buffer 51, flags are set and reset in accordance with the digital signal values for the microphones 42-1, 42-2, 42-3, and 42-4. The contents of the flags in the input buffer 51 are distributed to storage buffers 52-1, 52-2, 52-3, and 52-4 provided for the microphones 42-1, 42-2, 42-3, and 42-4, respectively.

The number of bits in each of these storage buffers 52-1, 52-2, 52-3, and 52-4 is the same as the number of samplings in the first predetermined period of, for example, four seconds. These storage buffers are ring shift registers so that the content of the oldest bit is replaced with that of the latest, in response to a sampling timing.

As a result, the bit at the time when the audio signal rises above the predetermined level is set in the corresponding storage buffer, and the total times MIC1on, MIC2on, MIC3on, and MIC4on, for which the audio inputs of the microphones 42-1, 42-2, 43-3, and 44-4 are confirmed, can be expressed by the number of set bits in the storage buffers 52-1, 52-2, 52-3, and 52-4. The set bits are then read and processed at each sampling time in a processing circuit 53.

Figure 6:
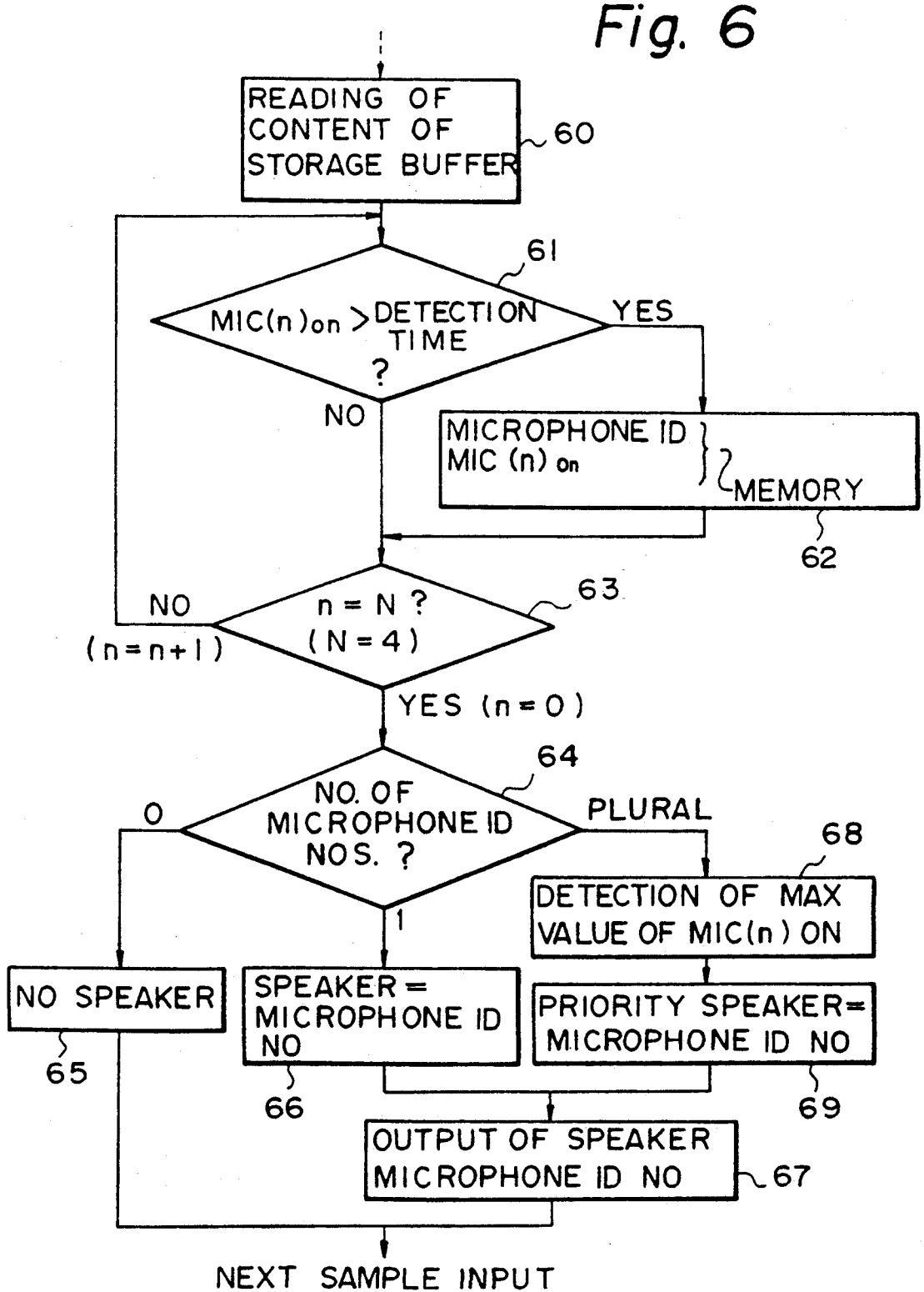
FIG. 6 is a flowchart for explaining the operation of a processing circuit in the television conference system according to the first embodiment of the present invention.

FIG. 6 is a flowchart for explaining the operation of the processing circuit 53.

In the processing circuit 53, the set bits are successively read in from the storage buffers 52-1 to 52-4 (step 60) and a comparison is made between each number of set bits and a preset detection time (2 seconds for example) (step 61).

Further, when the total time MIC(n)on of the confirmation of microphone input is over the first predetermined period (detection time) (YES in step 61), the identification number of the corresponding one of the microphones 42-1, 42-2, 42-3, and 42-4 and the total time MIC(n)on thereof are stored in a memory (not shown) (step 62).

When the completion of the comparison of all the total times MIC(n)on and the detection time (step 61) is confirmed (YES in step 63), judgement is made to determined if the total number of the microphone identification numbers, which is stored in the memory when the above-mentioned total time MIC(n)on is over the detection time, is zero, singular, or plural (step 64).

When the number of microphone identification numbers stored at that time is zero, it is determined that none of the participants 41-1, 41-2, 41-3, 41-3, and 41-4 is speaking and that there is no speaker (step 65).

Further, when the number of microphone identification numbers stored is one, one of the participants 41-1, 41-2, 41-3, or 41-4 of the microphone 42-1, 42-2, 42-3, 42-3, or 42-4 indicated by that microphone identification number is specified as the current speaker (step 66), and a signal containing that microphone identification number is output to the swivel base control apparatus 46 (step 67).

As a result, the camera 48 is swiveled by the power swivel base 47 so as to capture a picture of the specified participant 41-1, 41-2, 41-3, or 41-4 of the microphone 42-1, 42-2, 42-3, 42-3, or 42-4 indicated by the microphone identification number at that time.

When the number of the microphone identification numbers stored is plural, the one with the longest total time MIC(n)on is searched for (step 68) and the participant 41-1, 41-2, 41-3, or 41-4 of the microphone 42-1, 42-2, 42-3, 42-3, or 42-4 indicated by the microphone identification number of that longest total time MIC(n)on is specified as the current speaker (step 69).

Therefore, the microphone identification number of the speaker specified by this forced priority is output (step 67) and the camera 48 is turned toward that speaker.

Figures 7A, 7B:
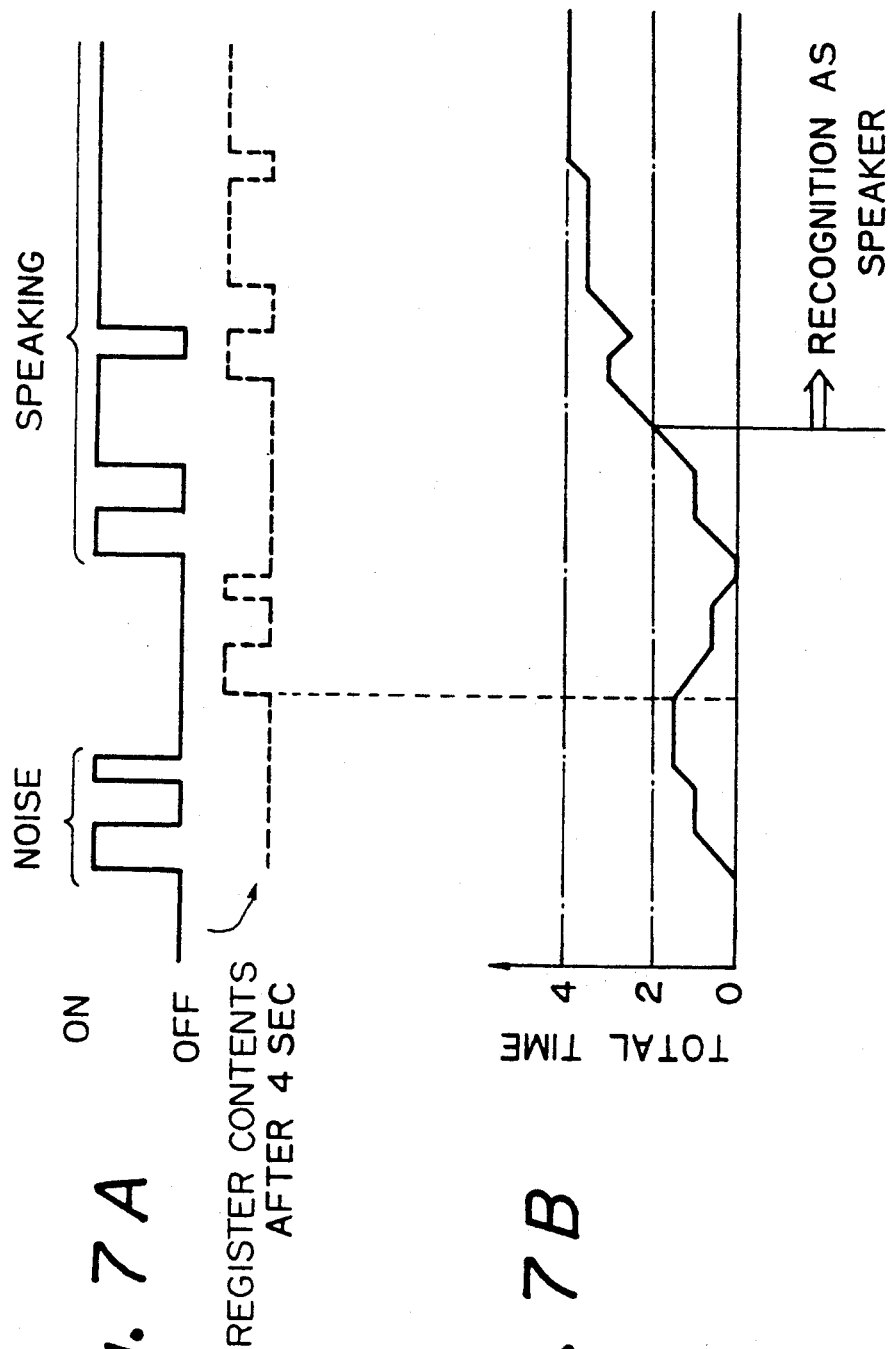
FIGS. 7A and 7B are diagrams for explaining the recognition of a speaker according to the first embodiment of the present invention.

FIGS. 7A and 7B are diagrams for explaining the recognition of a speaker. Referring to FIGS. 7A and 7B, an explanation is made of the operation of specifying the speaker in this embodiment. If there is a microphone input as shown in FIG. 7A, the total time MIC(n)on during each 4 second time period changes as shown in FIG. 7B.

Here, as shown in FIG. 7A, first a noise is applied as the microphone input, but this noise does not occur for over 2 seconds with in the 4 second time frame, so the camera 28 will not be mistakenly turned in the direction of that microphone.

Further, as shown in FIG. 7A, if speech begins after the noise, when the total length of time of the speaking in the 4 second time frame becomes 2 seconds, the person speaking is recognized as the speaker and the camera 28 is immediately turned toward the speaker without waiting for the speaking to continue for 2 more seconds as in the conventional art.

Further, even when the speaker breaks off speaking to obtain the agreement of the others or determine their reaction, the speaker is specified for the total time, so the same person is recognized as the speaker.

Here, it is generally assumed that the noise does not continue for over 2 seconds, during one portion of speech, and the speech is not cut off for over 2 seconds. According to this general assumption, the first period of 4 seconds and the second period of 2 seconds are determined.

Therefore, it is possible to completely eliminate mistaken specification of a speaker due to noise.

Further, when a microphone input of over 2 seconds counted in the 4 second time frame is recognized, someone is definitely speaking, so it is possible to reliably specify the speaker who is speaking.

Also, since the speaker is specified by totaling the time of the microphone input, even in the case where speech is cut off at the start, the speaker can be quickly specified.

In this way, according to this embodiment, it is possible to quickly and accurately recognize the speaker while completely eliminating the effects of noise.

Figure 8A:
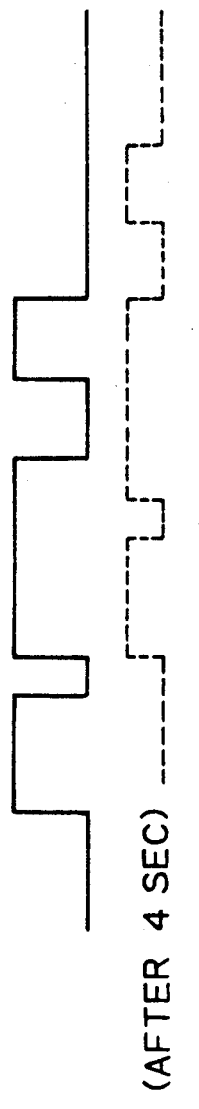
FIGS. 8A to 8D are diagrams for explaining the recognition of a speaker among plural speakers, according to the first embodiment of the present invention.
Figure 8B:

FIGS. 8A to 8D explain the operation in the case where there is another microphone input while a speaker is speaking. In this case noise is input into a microphone as shown in FIG. 8B while a speaker is speaking as shown in FIG. 8A, and before the speaking ends, another person begins speaking after this noise.

Figure 8C:
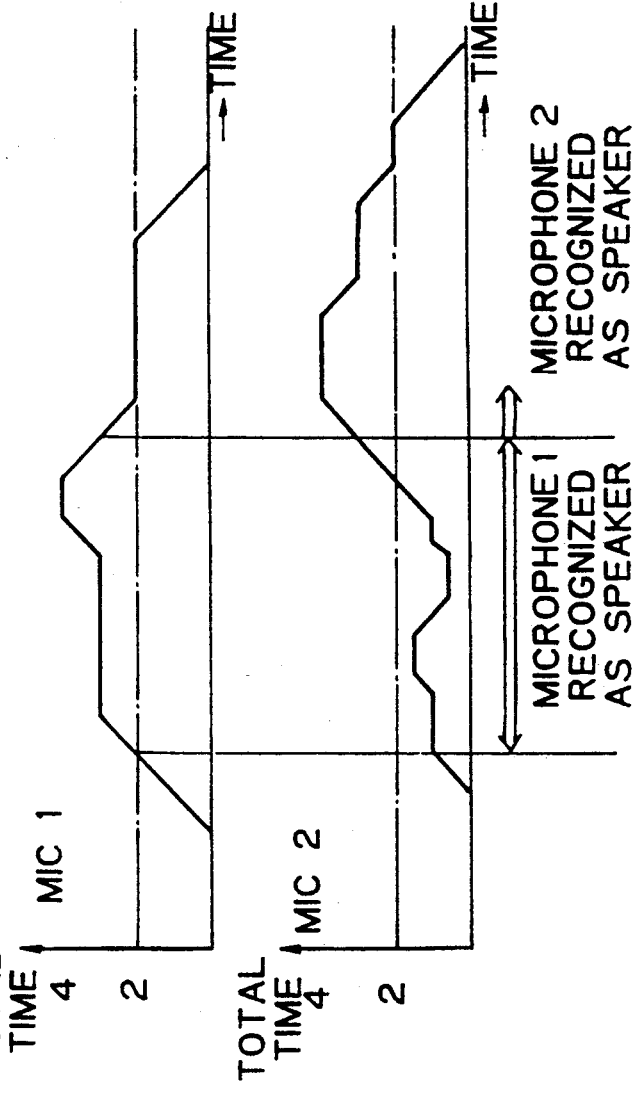
Figure 8D:
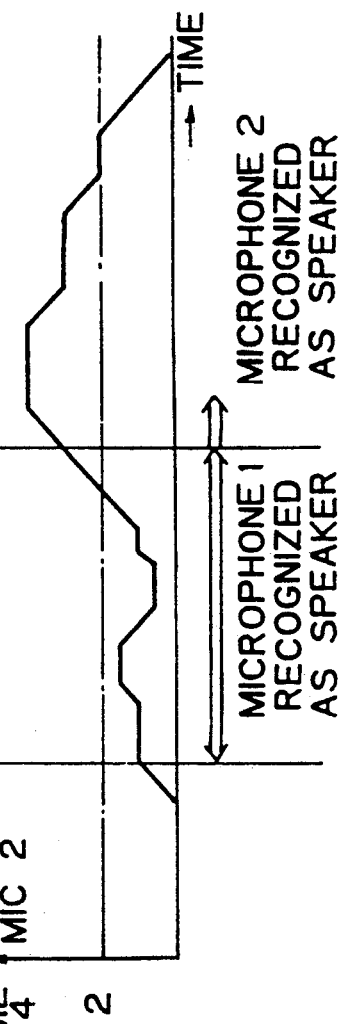

Here, the speaker is specified by totaling the microphone input time, and the total time of the noise input will never exceed the above-mentioned first period or the detection time, as will be understood from FIGS. 8C and 8D, even in the case where noise input into one microphone overlaps the speaking of a speaker input into another microphone, there will be no mistaken recognition of a speaker, whereas, in the conventional art, there was a mistaken recognition of a speaker in the above-mentioned situation, as mentioned before with reference to FIGS. 2A to 2F.

Further, even in the case where another person speaks while the current speaker is speaking, priority is given to the longer speech continuation time for recognition of the speaker, so it is possible to smoothly switch among speakers to be shot without giving any feeling of strangeness to the viewers.

In this way, according to the first embodiment, even when microphone inputs overlap, it is possible to smoothly direct the camera 48 without error to the speaker who is speaking.

As explained above, according to the first embodiment of the present invention, the participant for which the second period of microphone input is recognized counted in the time frame of the first period is specified as the speaker, so the specification may be performed extremely accurately and it is possible to completely eliminate the effects of noise.

Figure 9:
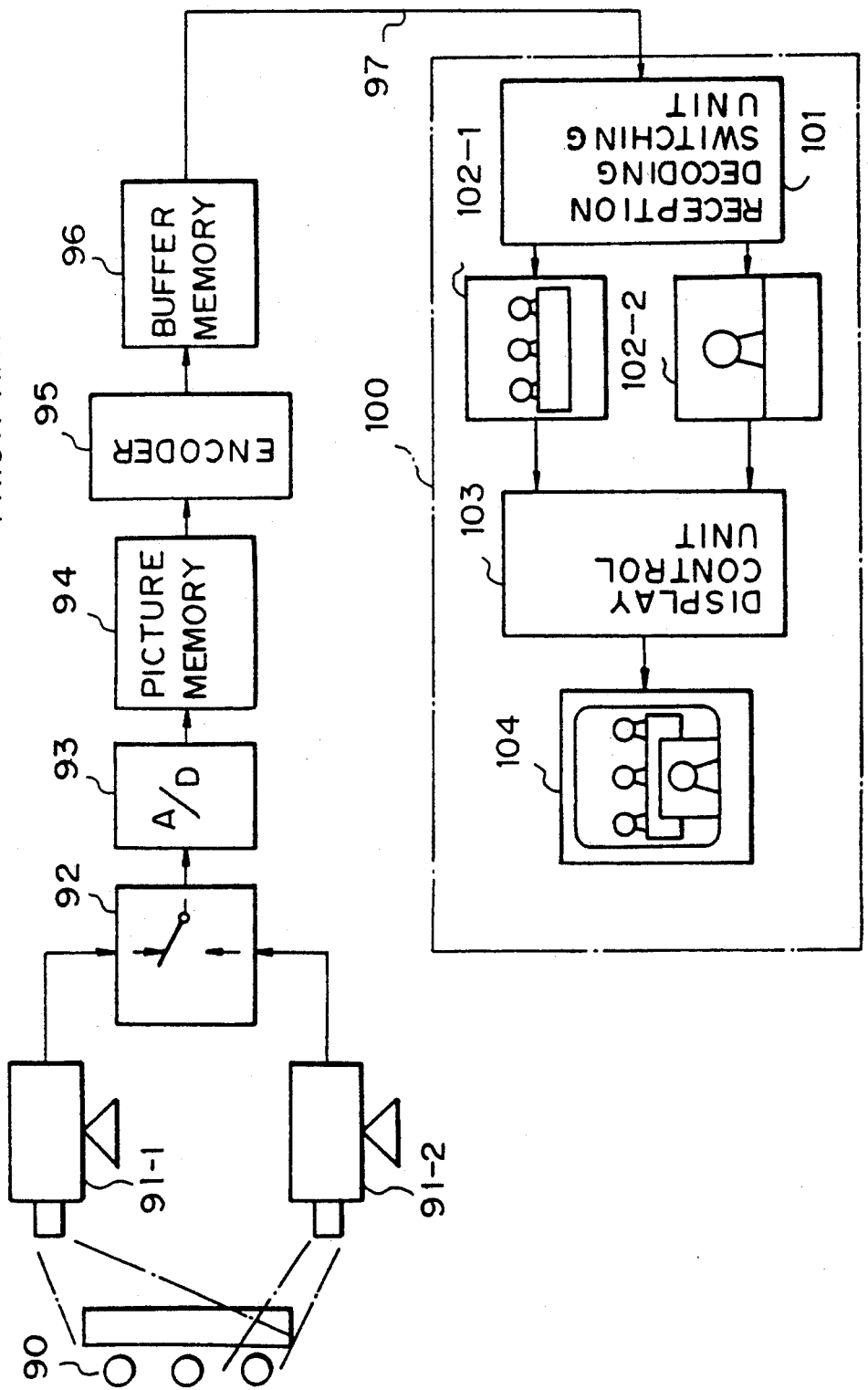
FIG. 9 is a block diagram of a conventional television conference system having a multipicture transmission function.

FIG. 9 is a block diagram of a conventional television conference system having a multipicture transmission function. In FIG. 9, the overview of the conference room including the conference participants 90 is shot by an overview shooting television camera 91-1, and a speaker among the participants is shot by a speaker shooting television camera 91-2. The analog video signals from the cameras 91-1 and 91-2 are input through a switching circuit 92 to an A/D converter 93 and are converted to digital video signals which are stored once in a picture memory 94, and then compressed and encoded by a sequential encoder 95. The compressed and encoded video signals are then transmitted through a buffer memory 96 to a transmission line 97 having a comparatively low speed. In this case, after transmitting one picture's worth of video signals of the overview from the television camera 91-1, several pictures' worth of the video signals of a portion of the overview from the television camera 91-2 are successively transmitted, and this is repeated.

On the reception side 100, the signals are received and decoded by a reception and decoding switching unit 101, then switching is performed so that the video signals from the television camera 91-1 are applied to a picture memory 102-1 and the video signals from the television camera 91-2 are applied to a picture memory 102-2. A display control unit 103 synchronizes, reads out, and combines the contents of the picture memories 102-1 and 102-2, converts the digital video signals to analog video signals, and applies the same to the display apparatus 104. Thus, the speaker is enlarged and displayed as a moving image in the overview of the conference room including the participants 90.

FIGS. 10A to 10C are views for explaining the conventional two-picture transmission when no data compression is effected.

FIG. 10A shows an example of the control signal for controlling the switching circuit 92 in FIG. 9. When this control signal is "0", the video signal from the television camera 91-1 is applied to the A/D converter 93 and when the control signal is "1", the video signal from the television camera 91-2 is applied to the A/D converter 93. Each picture's worth of video signals represents one field of the video signals. Therefore, as shown in FIG. 10B, one picture's worth of the video signals B from the television camera 91-1 is converted to digital signals by the A/D converter 93, encoded by the encoder 95 through the picture memory 94, and transmitted, then, as shown by FIG. 10C, four pictures' worth, as an example, of video signals A from the television camera 91-2 are successively converted to digital signals by the A/D converter 93, encoded through the picture memory 94 by the encoder 95, and transmitted.

Therefore, in the conventional art, one picture's worth of video signals A is dropped when the other video signals B are transmitted. Normally, however even more fields of the video signals A from the television camera 91-2 are successively transmitted. Therefore, generally speaking, the dropping of only one picture's worth of video signals does not cause a serious problem. On the reception side 100, it is possible to display on a display apparatus 104 the overview of the conference room as a static image and a portion of the same, such as a speaker, as a moving image.

FIGS. 11A to 11C are views for explaining data compression.

As shown in FIG. 11A, a video signal without being compressed generally consists of 30 frames per second. In general, one frame of the video signal from the television camera 91-1 or 91-2 is constituted by a pair of fields comprising an even number field and an odd number field. Therefore, the transmission speed of the video signal is generally 60 fields/second. Further, in an electronic television conference system, the general practice is to encode and transmit only the odd number fields. Therefore, as shown in FIG. 11A, it is sufficient to process the video signals of 30 odd number fields $V_1$ to $V_{30}$ in one second when data compression is not effected.

Assuming that the transmission speed of each field passing through the transmission line 97 is 64 Kb/s, when the video signals of one of the fields, for example $V_1$ as shown in FIG. 11B, are compressed and encoded so that an encoded data of 32 Kb/s is obtained, the compressed and encoded data CV1 of the field V1 requires 500 ms. Therefore, the next field which is able to be compressed and encoded is V8 as shown in FIG. 11B. When the transmission speed of the compressed and encoded field CV8 is 25.5 Kb/s, the transmission time is about 83.3 ms. The next field capable of being compressed and encoded is V11.

Accordingly, when the video signals are compressed, video signals of only a limited number of fields such as V1, V8, and V11 as shown in FIG. 11B can be transmitted and the remaining fields are dropped. This causes a serious problem in transmitting moving pictures.

As a summary of the above-mentioned conventional art, the video signals input into the A/D converter 93 are switched, and then converted to digital signals and encoded and transmitted in picture units. Even with compression and encoding, transmission is carried out through a transmission line at a relatively low speed of about 64 Kb/s. Therefore, during transmission of the video signals B, the video signals A cannot be transmitted. At this time, in cases when the video signals B are not compressed, only one picture's worth of the video signals A would be lost, so it is possible to display the signals as a moving image, but when the number of bits of the encoded data of the video signals B increases and the time required for transmission become over one second, the picture would not appear as a moving image because transmission of the video signals A is not possible during that period. Therefore, a defect arose causing a lower effectiveness in imparting a feeling of presence in a conference environment.

The second embodiment of the present invention has as its object control of the transmission so as to enable display as a moving image even in the transmission of multiple pictures.

Figure 12:
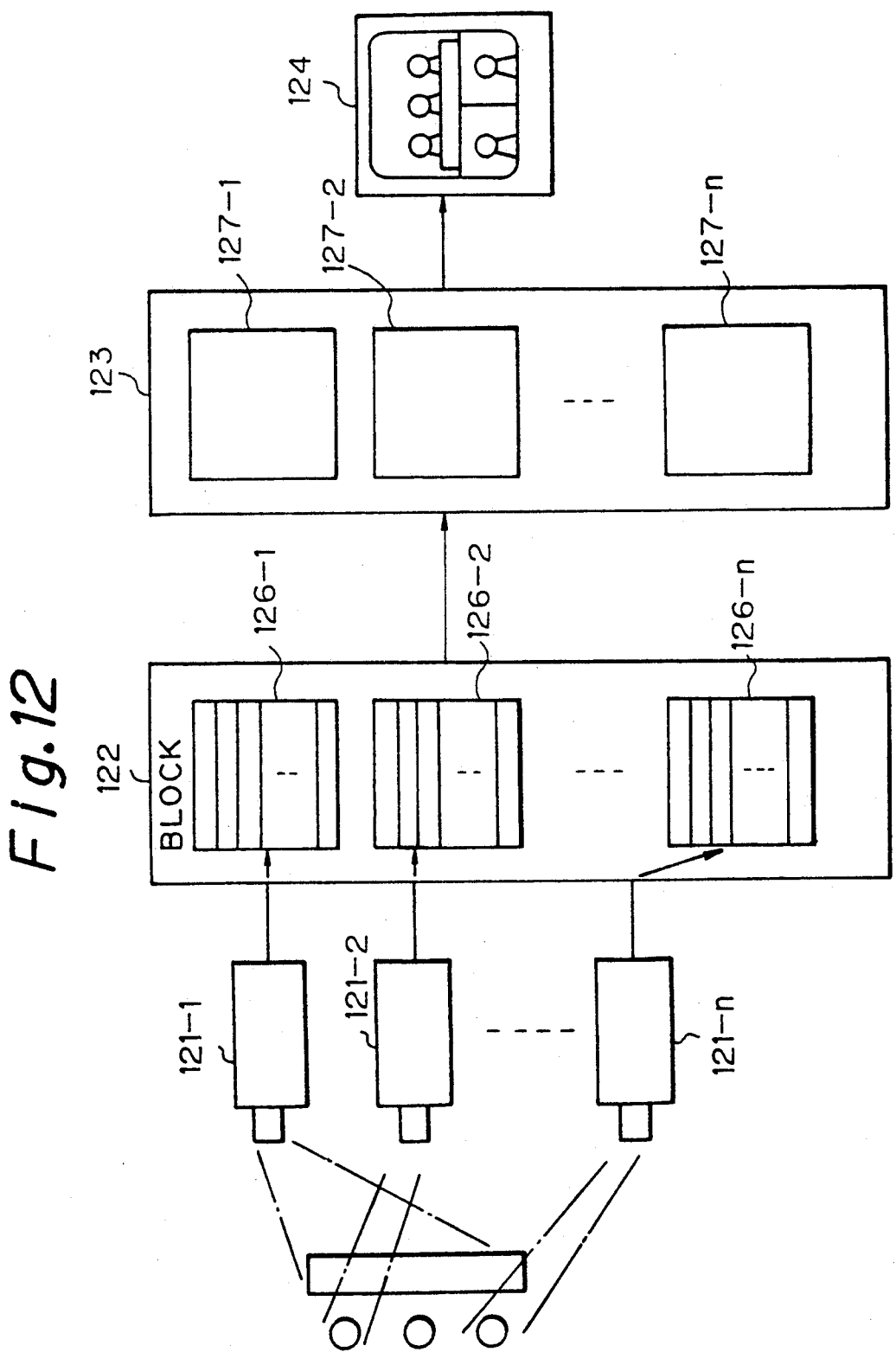
FIG. 12 is a block diagram for explaining the principle of a multipicture transmission according to the second embodiment of the present invention.

FIG. 12 is a block diagram of a multipicture transmission control system of a television conference system according to the second embodiment of the present invention.

The multipicture transmission control system in the second embodiment divides each picture into several blocks, and transmits signals corresponding to the divided blocks in accordance with a transmission ratio. The principle of the second embodiment will be explained with reference to FIG. 12.

The multipicture transmission control system is provided with a plurality of television cameras 121-1 to 121-n including at least a television camera 121-1 which shoots an overview and television cameras 121-2 to 121-n which shoot portions inside the overview. Video signals from the plurality of television cameras 121-1 to 121-n are transmitted from a transmission unit 122 to a reception unit 123. The reception unit 123 combines the video signals and displays the result on a display unit 124 such as a cathode ray tube (CRT). Each block of one picture's worth of video signals from the plurality of television cameras 121-1 to 121-n is divided into plural blocks. The video signals are then switched in units of the blocks in accordance with a transmission ratio of the video signals from the television camera 121-1 which shoots the overview and the video signals from the television cameras 121-2 to 121-n which shoot portions of the overview. The transmission unit 122 includes picture memories 126-1 to 126-n corresponding to the television cameras 121-1 to 121-n which shoot portions of the overview. The transmission unit 122 includes picture memories 126-1 to 126-n corresponding to the television cameras 121-1 to 121-n. Each of the picture memories 126-1 to 126-n stores one picture's worth of video signals which are divided into blocks. Transmission is performed by switching in block units. The reception unit 123 also includes picture memories 127-1 to 127-n corresponding to the television cameras 121-1 to 121-n. The contents of the picture memories 127-1 to 127-n are updated in block units. The contents of the picture memories 127-1 to 127-n are combined, and the combined result is applied to the display unit 124.

In operation, the television camera 121-1 shoots the overview of the conference room, etc., the television cameras 121-2 to 121-n shoot portions of the same such as the speaker, and the transmission unit 122 divides the content of each of the picture memories 126-1 to 126-n corresponding to the television cameras 121-1 to 121-n into plural blocks, switches in accordance with a transmission ratio in block units, and encodes and transmits in block units. For example, the video signal from the television camera 121-1 is transmitted in block units and until one picture's worth of transmission is completed, several pictures, worth of video signals from other television cameras 121-2 to 121-n are transmitted, though also in block units.

In the reception unit 123, the contents in the picture memories 127-1 to 127-n corresponding to the picture memories 126-1 to 126-n in the transmission unit 122 are updated in block units. Due to the transmission of video signals of the overview, which are displayed as a static image, the loss of continuity of the video signals of the portion in the overview became large in the conventional art. By contrast, according to the second embodiment of the present invention, it becomes less so that it is possible to improve the quality of the image produced.

Below, a detailed explanation will be made of the second embodiment of the present invention.

Figure 13:
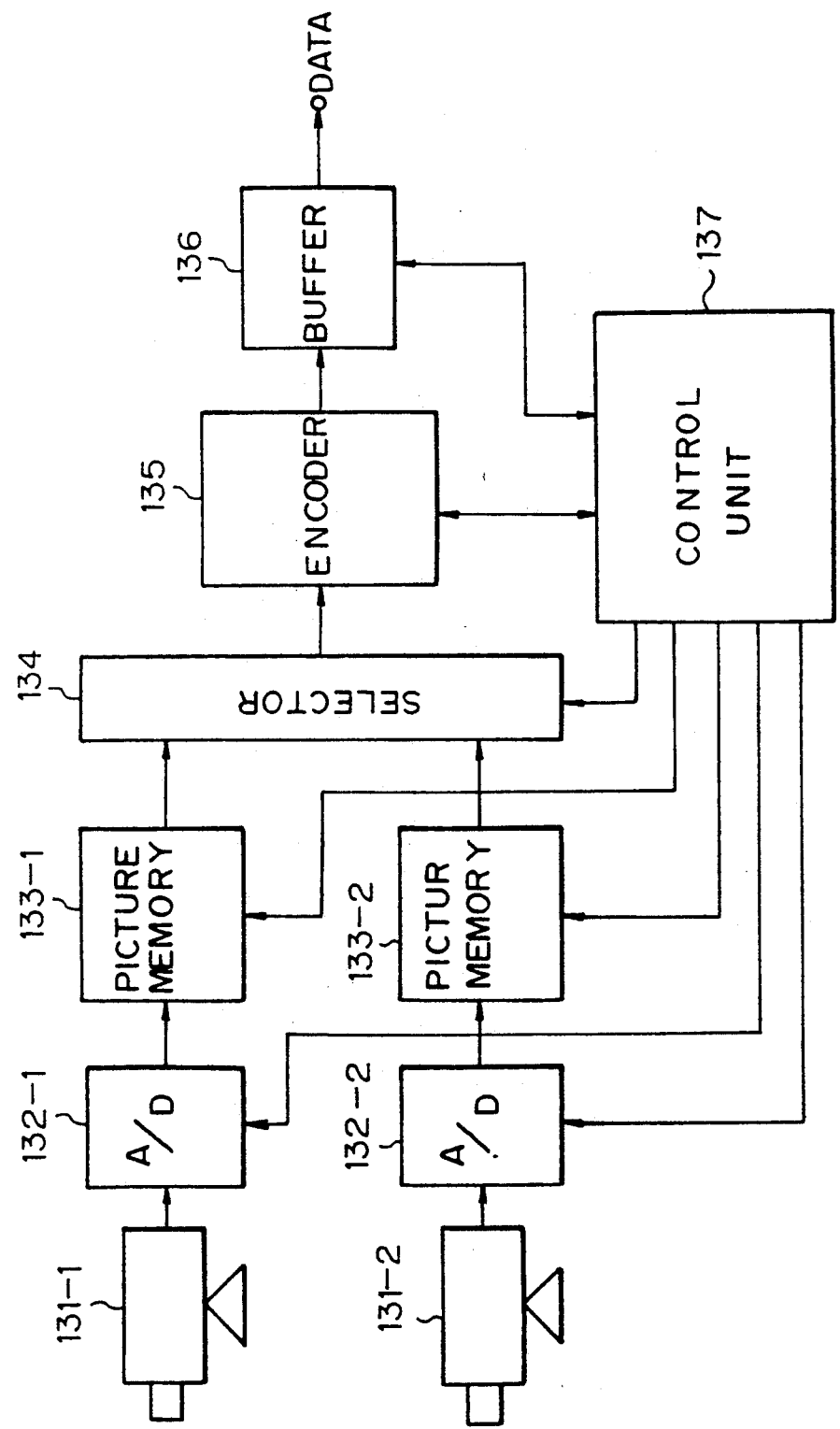
FIG. 13 is a block diagram of a transmission part of a television conference system according to the second embodiment of the present invention.

FIG. 13 is a block diagram of a transmission part of a television conference system according to the second embodiment of the present invention. In FIG. 13, one television camera 131-1 is for shooting the overview of the conference room. The other television camera 131-2 is for shooting portions in the overview such as the speaker. The video signals output from these cameras are converted into digital signals by A/D converters 132-1 and 132-2 and the converted results are applied to picture memories 133-1 and 133-2. Each of the picture memories 133-1 and 133-2 have at least one picture's worth of capacity, and each pictures worth of video signals is divided into plural blocks. The contents in each memory are read out in block units.

A selector 134 is controlled by a control unit 137 so that the digital video signals read out from the picture memories 133-1 and 133-2 in accordance with a transmission ratio are applied to an encoder 137. The encoder 135 transmits to the control unit 137 a block processing end signal for each end of compression and encoding of one block's worth of digital video signals. For example, if the transmission ratio of the video signals of a portion to the video signals of the overview is made 1 to 4, the control unit 137 counts the block processing end signals, and when the compression and encoding of four blocks worth of digital video signals from the image memory 133-2 end, the control unit 137 controls the selector 134 so that the compression and encoding of the one blocks worth of digital video signals from the picture memory 133-1 are carried out.

The encoder 135 may be one of various types of compression and encoding constructions. Normally, use is made of variable length encoding where signals with a high frequency of occurrence are made with short codes. The encoded data is stored once in a buffer memory 136, and readout, and transmission is performed at a speed in accordance with the transmission speed of the transmission line.

Figure 14:
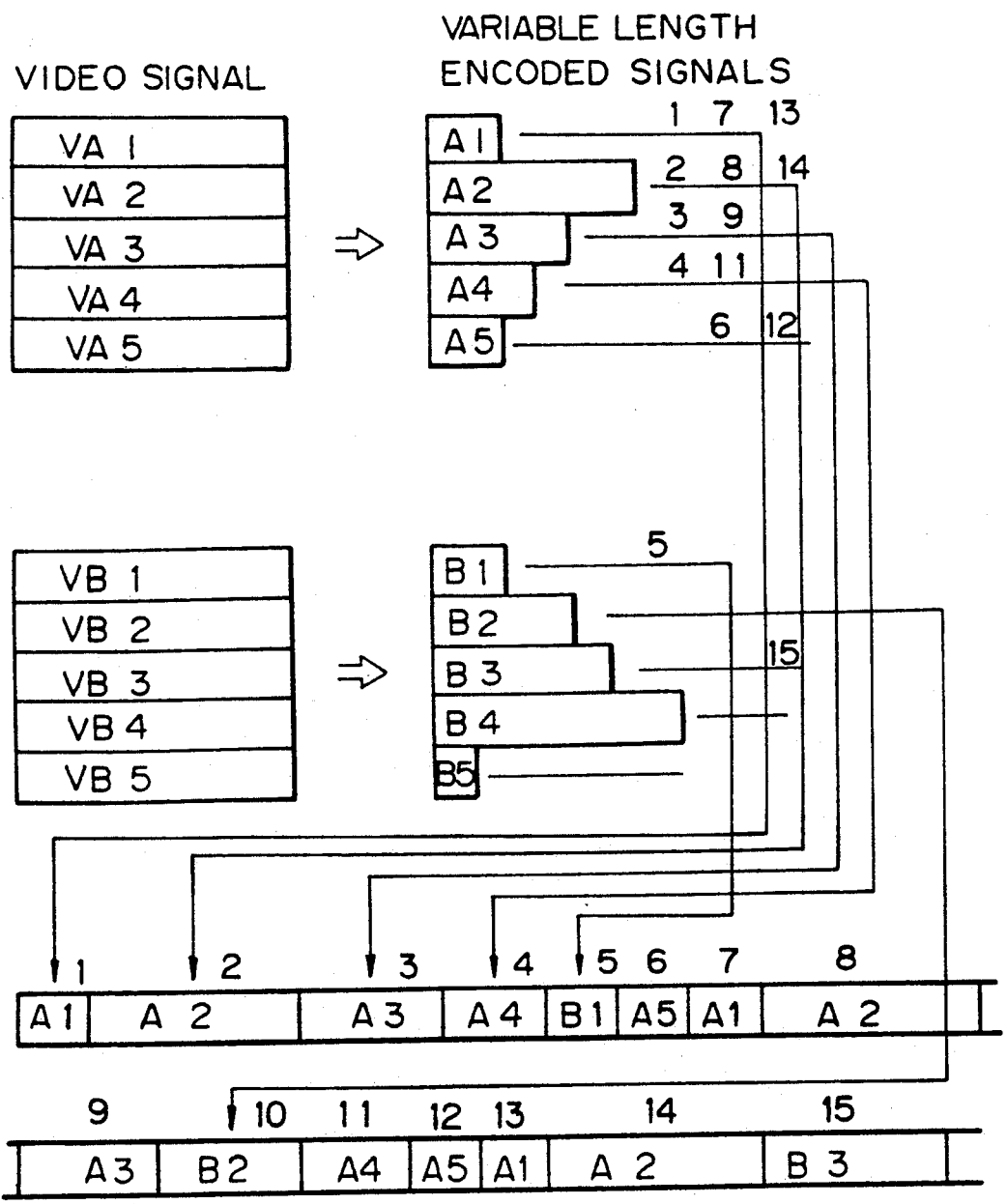
FIG. 14 is a diagram for explaining the operation of the system shown in FIG. 13.

FIG. 14 is a diagram for explaining the operation of the system shown in FIG. 13. In FIG. 14, one picture is assumed, for example, to be divided into five blocks. The video signals of the five blocks from the television camera 131-2 which shoots a portion in the overview are assumed to be VA1 to VA5, the video signals from the television camera 131-1 which shoots the overview are assumed to be VB1 to VB5, and the variable length encoded data for the respective blocks are A1 to A5 and B1 to B5. Then, in the case where the transmission ratio is made 1 to 4 as mentioned before, the encoded data B1 is transmitted after the transmission of the encoded data A1 to A4, then the encoded data B2 is transmitted after the transmission of the encoded data A5 and A1 to A3. Therefore, four blocks worth of the encoded data A1 to A4 are transmitted successively, then one blocks worth B1 in the encoded data B1 to B5 is transmitted. Then, another successive four blocks worth A5, A1, A2, and A3 are transmitted. As a result, the time of suspension of transmission is shortened and, in the case of reproduction and display on the reception side, the movement of the content of the display becomes smooth.

A block end signal representing the end of the coded data of each block unit is transmitted from the transmission side to the reception side. On the reception side, the block end signals are counted to identify the encoded data A1 to A5 and B1 to B5 so as to decode the same. The decoded data are written into corresponding picture memories. Thus, a combined picture can be displayed.

Figure 15:
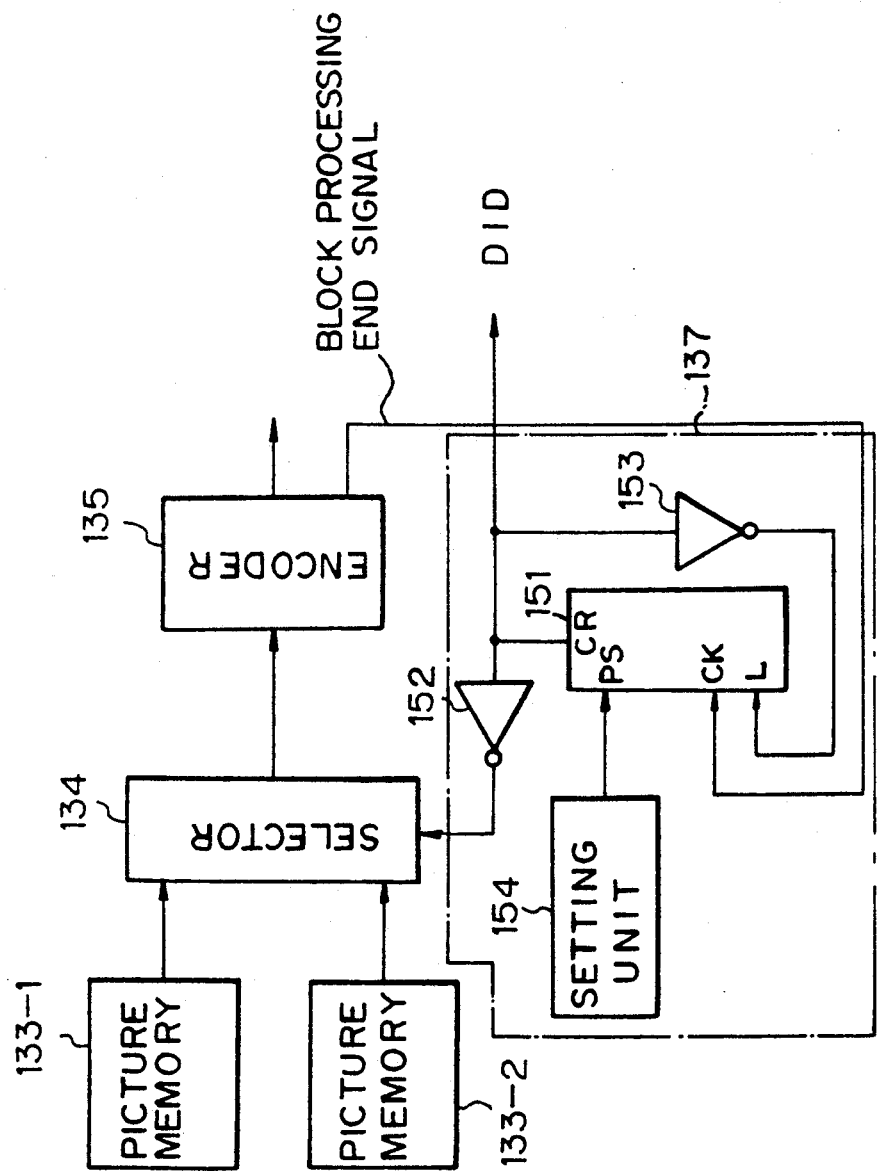
FIG. 15 is a block diagram of a selector control unit in the system shown in FIG. 13.

FIG. 15 shows a detailed block diagram of the control unit 137 in the system in FIG. 13. In FIG. 15, reference numeral 151 is a four-bit counter, 152 and 153 are inverters, and 154 is a setting unit for setting a transmission ratio. Other reference numerals the same as in FIG. 13 show the same portions. The setting value of the transmission ratio from the setting unit 154 is applied to the preset terminal PS of the counter 151. This setting value is loaded by a load signal applied to the load terminal L. The processing end signal for one block from the encoder 135 is applied to the clock terminal CK and counted up. By this count up operation, the number of blocks are counted. A carrier signal is generated from the carrier terminal CR each time the four processing end signals are counted. The carrier signal becomes the data discrimination signal DID. Also, the carrier signal is applied through the inverter 152, to the selector 134, and the carrier signal becomes the load signal through the inverter 153.

FIGS. 16A to 16C are diagrams for explaining the operation of the selector control unit 151, wherein FIG. 16A shows the block processing end signal, FIG. 16B shows the count content of the counter 151, and FIG. 16C shows the carrier signal. The case shown is for a transmission ratio of 1 to 4. The block processing end signal shown in FIG. 16A is applied to the clock terminal CK of the counter 151, and the count content becomes (1), (2), (3), and (4). When it becomes (4), the carrier signal is output as shown by FIG. 16C. Then, the counter 151 is preset to (1) by the next block processing end signal.

The selector 134 selects the picture memory 133-1 in FIG. 13 when the carrier signal is "1", i.e., when the output signal from the inverter 152 is "0". The selector 134 selects the picture memory 133-2 when the carrier signal is "0", i.e., when the output signal from the inverter 152 is "1". Accordingly, after one block in the picture memory 133-1 is selected to be applied to the encoder 135, four blocks in the picture memory 133-2 are successively selected to be applied to the encoder 135.

FIGS. 17A to 17D are diagrams for explaining the transmission by the system shown in FIG. 13; and FIGS. 17E to 17H are diagrams for explaining the conventional art. In the figures, a case is shown where one picture is divided into five blocks and the transmission ratio of the overview and the portion of the same is 1 to 4. FIGS. 17A and 17C show the control signal applied to the selector 134, and FIGS. 17B and 17D show the transmission data. When the control signal is "1", the picture memory 133-2 is selected. When the control signal is "0", the picture memory 133-1 is selected. Further, A1 to A5 and B1 to B5 are encoded data for respective blocks.

When the control signal shown by FIGS. 17A and 17C is "1", four blocks in the encoded data A1 to A5 are successively transmitted, and when the control signal is "0", one block of the encoded data B1 to B5 is transmitted.

The encoded data A1 to A5 is the data for displaying the portion in the overview of the conference such as a participant. The encoded data B1 to B5 is the data for displaying the overview of the conference. The data for one picture's worth of the portion in the overview consists of the five blocks of data A1 to A5. Also, the data for one picture's worth of the overview consists of the five blocks of data B1 to B5.

The continuity of the portion displaying data A1 to A5 is disconnected by only one block of the overview displaying block B1, B2, . . . , or B5. Since one block of data takes a very short time of up to 100 ms, even when the compressed data of one picture's worth takes as long as 500 ms as described in the conventional example shown in FIG. 11C. Therefore, the picture reproduced by the encoded data A1 to A5 for displaying portions in the overview has sufficient continuity.

Since the picture reproduced by the overview displaying blocks B1 to B5 is, in most cases, a static picture, the discontinuity of the blocks does not cause a serious problem.

As shown in FIGS. 17B and 17D, the amount of data generated by the compression and encoding is not constant. For example, transmission of the initial picture may be at 525 ms, with insertion of the encoded data B1 midway, for transmitting all of the five blocks of encoded data A1 to A5. The transmission of the next picture may be at 475 ms, with insertion of the encoded data B2 midway, for transmitting all five blocks of the encoded data A1 and A5. The encoded data B1 to B5 is divided into block units and transmitted between the encoded data A1 to A5.

As opposed to this, in the conventional art, as shown by FIGS. 17E and 17G, even if one picture is worth of data is divided into five blocks, the one picture's worth of encoded data B1 to B5 is transmitted successively, so the picture represented by the encoded data A1 to A5 transmitted after the transmission of the encoded data B1 to B5 requires, for example, 925 ms. Thus there is an interval of approximately one second, so a noncontinuous reproduced image is obtained.

In the above-described second embodiment, the transmission ratio between the portion displaying data and the overview displaying data is determined in block units, i.e., four blocks to one block.

Figure 18:
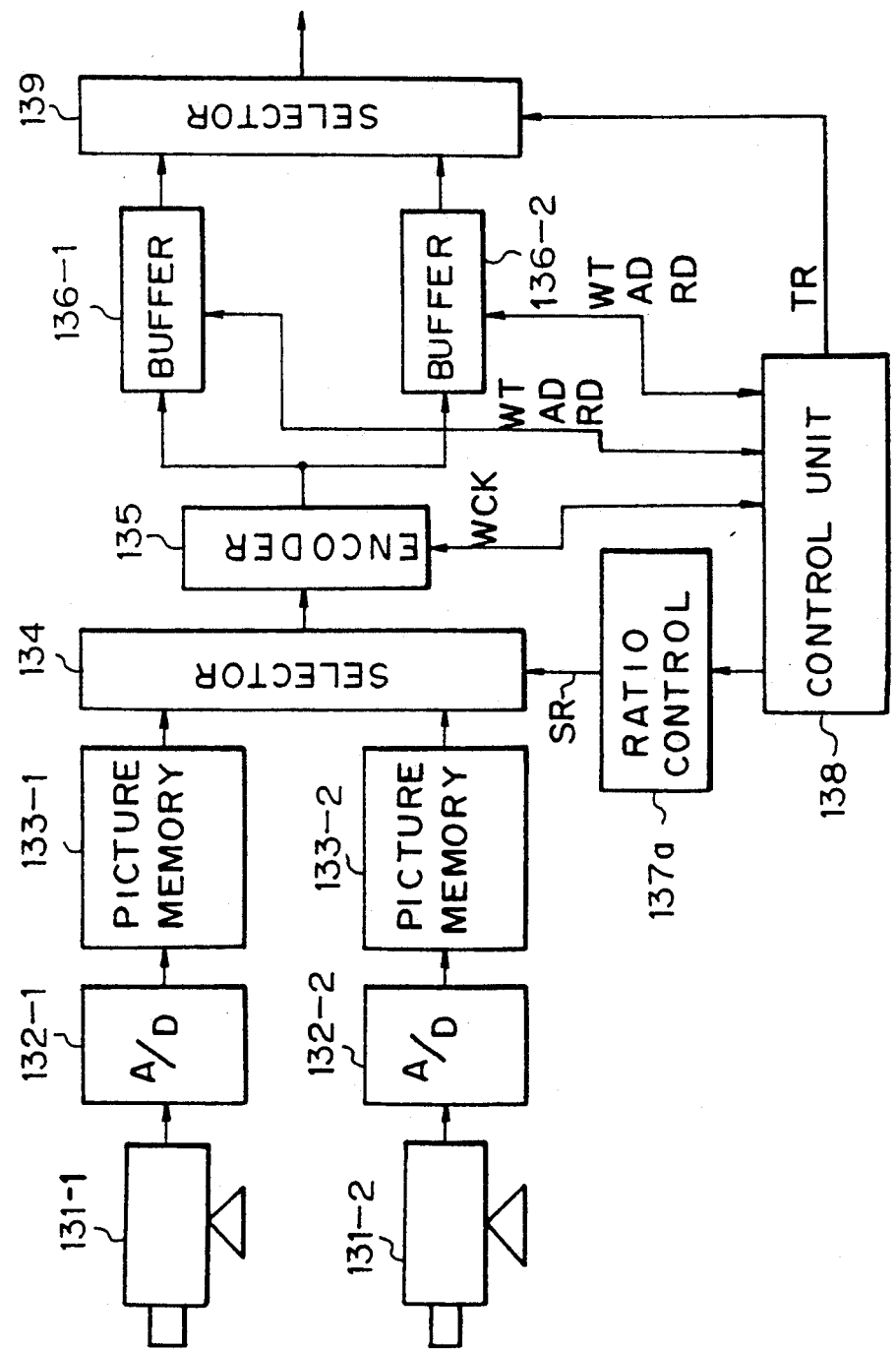
FIG. 18 is a block diagram of a transmission part of a television conference system according to the third embodiment of the present invention.

By contrast, in the following third embodiment, the transmission ratio is determined in bit units. FIG. 18 is a block diagram of a transmission part of a television conference system according to the third embodiment of the present invention.

In FIG. 18, the same reference numerals used in FIG. 15 represent the same parts. The difference between FIGS. 15 and 18 is that, in FIG. 18, a ratio control unit 137a, a control unit 138, two buffers 136-1 and 136-2, and a selector 139 are provided. The constitution of the ratio control unit 137a is almost the same as that of the selector control unit 137 in FIG. 15 except that the set ratio is variable depending on the amounts of data in the buffer memories 136-1 and 136-2.

The ratio control unit 137a provides a set ratio SR, which is variable depending on the amounts of data in the buffer memories 136-1 and 136-2, as a control signal applied to the selector 134.

Between the encoder 135 and the control unit 138, a control signal line for transmitting a write clock signal WCK and so forth is connected. Between the buffer memory 136-1 or 136-2 and the control unit 138, a control signal line for transmitting a write signal WT, and a write address signal AD or read address signal RD, is connected.

In this embodiment also, an explanation will be made in the case of an overview of the entire conference room, etc., shot by the television camera 131-2 and a portion of the same shot by the television camera 131-1. The analog video signals from the television cameras 131-1 and 131-2 are converted to digital video signals by the A/D converters 132-1 and 132-2, and are stored in the picture memories 133-1 and 133-2. The block unit digital video signals read out from the picture memories 133-1 and 133-2 through the selector 134 controlled by the ratio control unit 137a are applied to the encoder 135 for compression and encoding. The encoded data is stored once in the buffer memories 136-1 and 136-2 corresponding to the picture memories 133-1 and 133-2 and the encoded data is transmitted from the selector 139 controlled in accordance with the transmission ratio.

The amount of data stored in the buffer memories 136-1 and 136-2 changes along with time since the amount of encoded data of the block units differs. To transmit the portion displaying data and the overview displaying data with a predetermined transmission ratio in bit units, the change of the amount of data in the buffer memories may cause a problem if the amount of data in one of the buffer memories is decreased to be insufficient to transmit. Therefore, in this embodiment, the amount of data stored is monitored by the control unit 137a and when the amount of data stored by one buffer memory becomes larger than the amount of data stored by another buffer memory, the selector 134 is controlled in accordance with a variable set ratio SR output from the ratio control unit 137a so as to correct this, i.e., to reduce the ratio of selection of block unit of the one where the amount of data stored has increased. As a result, the two buffer memories 136-1 and 136-2 always store a sufficient amount of data. The selector 139 is then controlled by the ratio control unit 137a based on the amount of data transmitted in accordance with a predetermined transmission ratio. Thus, the data stored in the buffer memories 136-1 and 136-2 is selected and transmitted.

Figure 19:
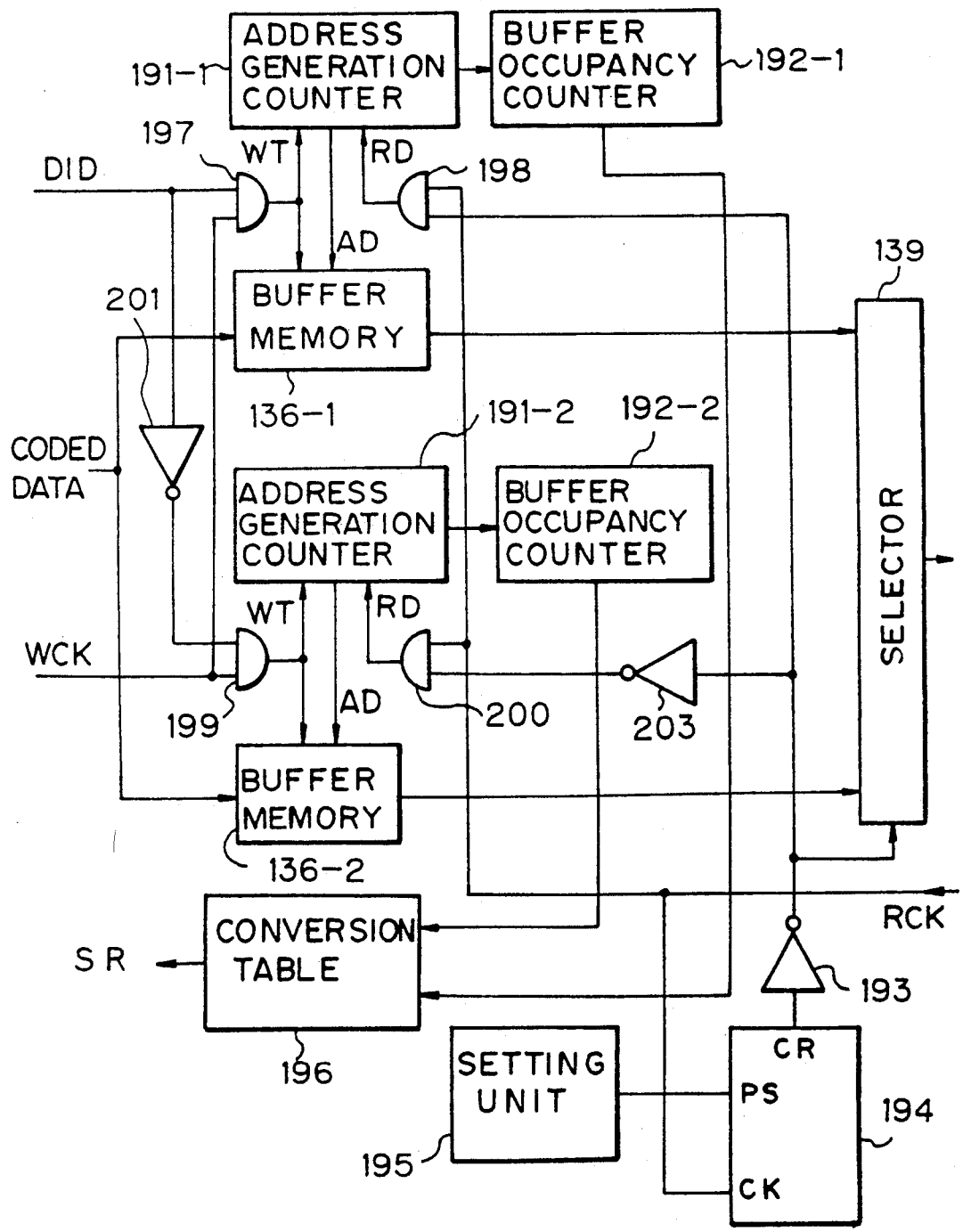
FIG. 19 is a detailed block diagram of a ratio control portion in the system shown in FIG. 17.

FIG. 19 is a detailed block diagram of the control unit 137a and the ratio control unit 138 in the system shown in FIG. 18. In FIG. 19, 136-1 and 136-2 are the buffer memories shown in FIG. 18; 191-1 and 191-2 are address generating counters; 192-1 and 192-2 are buffer occupancy counters; 139 is the selector shown in FIG. 18; 194 is a counter; 195 is a ratio setting unit for setting the transmission ratio TR of data to be output from the selector 139. 196 is a conversion table for obtaining the variable set ratio SR; 197, 198, 199, and 200 are AND circuits; and 193, 201, and 203 are inverters. RCK is a data read clock signal; DID is a data identification signal; WCK is a data write clock signal; AD is an address signal; RD is a read clock signal; and WT is a write clock signal.

The buffer memories 136-1 and 136-2 in FIG. 19 are the same as the buffer memories 136-1 and 136-2 in FIG. 18. The selector 139 in FIG. 19 is the same as the selector 139 in FIG. 18. Further, the data read clock signal RCK is generated every time each bit of the data is transmitted. It is applied to the clock terminal CK of the counter 194 and to the AND circuits 198 and 200.

Further, the data identification signal DID is a signal for identifying the encoded data corresponding to the television cameras 131-1 and 131-2 (see FIG. 18). It becomes "1" when the picture memory 133-1 is selected by the selector 134 and becomes "0" when the picture memory 133-2 is selected. Therefore, when the picture memory 133-1 is selected, the data write clock signal WCK passes through the AND circuit 197 and is applied, as the write clock signal WT, to the buffer memory 136-1 and the address generation counter 191-1. Then the encoded data, formed by compressing and encoding the block units of digital video signals from the picture memory 133-1, is written into the buffer memory 136-1. Similarly, when the picture memory 133-2 is selected, the write clock signal WT passes through the AND circuit 199, is applied to the buffer memory 136-2 and the address generation counter 191-2, and the encoded data, formed by compressing and encoding the block units of digital video signals from the picture memory 133-2, is written in the buffer memory 136-2.

The predetermined transmission ratio set in the setting unit 195 is applied to the preset terminal PS of the counter 194, so that the data read clock signals RCK are counted up, and when a carrier signal ("1") from the carrier terminal CR is output, inversion is performed by the inverter 193, further inversion is performed by the inverter 203, a read clock signal RD is applied through the AND circuit 200 to the address generation counter 191-2, the read address is advanced in the counter 191-2, and encoded data is read out from the buffer memory 136-2. At this time, the selector 139 selects and outputs the encoded data from the buffer memory 136-2 since the control signal of the output of the inverter 193 is "0". Further, when the carrier signal CR becomes "0", a read clock signal RD is applied to the address generation counter 191-1 through the AND circuit 198, the read address is advanced in the counter 191-1, and encoded data is read out from the buffer memory 136-1. At this time, the selector 139 selects and outputs the encoded data from the buffer memory 191-1 since the control signal of the output of the inverter 193 becomes "1".

The buffer occupancy counters 192-1 and 192-2 store the buffer occupancy amounts in the buffer memories 136-1 and 136-2 by reading the write addresses and read addresses from the address generation counters 191-1 and 191-2, respectively. The conversion table 196 stores a number of ratios corresponding to the buffer occupancy amounts. Therefore, by using the buffer occupancy amounts read from the buffer occupancy counter 192-1 and 192-2 as the reading addresses, the corresponding ratio is read as the variable set ratio SR. The set ratio is applied to the selector 134 in FIG. 18.

FIGS. 20A to 20G are explanatory views for explaining the operation of the circuit shown in FIG. 19. In the figures, it is assumed that the transmission ratio of data to be transmitted from the selector 139 is fixedly set at 1 to 4, and encoded data is transmitted in one bit units. Namely, instead of the transmission ratio of 1 to 4 in block units as in the second embodiment, the transmission ratio of 1 to 4 in bit units is employed in this third embodiment.

In FIG. 20A, each of A1, A2, A3, . . . represented by A, is one bit of the encoded data for the portion of the overview, each of B1, B2, B3, . . . represented by B, is one bit of the encoded data for the overview. FIG. 20B shows the data read clock signal RCK, FIG. 20C shows the carrier signal CR, FIG. 20D shows occupancies $\alpha$, $\alpha1$, $\alpha2$, $\alpha3$, $\alpha4$, $\alpha'$, $\alpha1'$, . . . of the buffer memory 136-1, FIG. 20E shows the occupancies $\beta$, $\beta1$, $\beta2$, $\beta'$, . . . of the buffer memory 136-2, FIG. 20F shows the data identification signal DID, and FIG. 20G shows an example of the write clock signal WT.

As can be seen from FIGS. 20A and 20C, the carrier signal CR from the counter 194 becomes "1"after transmitting the four bits of the encoded data A so that one bit of the encoded data B is selected and output by the selector 139. Therefore, the transmission ratio between the encoded data for the overview and the encoded data for the portion of the same is ensured to be 1 to 4. During the data transmission, the amount of data occupancy in the buffer memories 136-1 and 136-2 is changed as follows. Namely, each time one bit of the encoded data A or B is transmitted, the respective buffer occupancy counter 192-1 or 192-2 is counted down. Also, each time one bit of the encoded data is written in accordance with the write clock signal WT, the buffer occupancy counter 183-2 to 193-2 is counted up. Therefore, the count content shows the occupancy. In FIGS. 20D and 20E, the amounts of data occupancies are at first $\alpha$ and $\beta$. After one bit of the data A is transmitted, $\alpha$ is decreased to α1=α−1. After one bit of data B is transmitted, β is decreased to β1=β−1. In a similar way, the amount of data α1 changes to α2, α3, and α4 sequentially each time one bit of the data A is transmitted. Also, the amount of data β1 changes to β2 and β3 sequentially each time one bit of data B is transmitted.

When the block units of encoded data are applied to the buffer memories 136-1 and 136-2, and when the data identification signal DID becomes "1" as shown in FIG. 20F, the write clock signal WT for writing this encoded data is applied to the buffer memory 136-1 and the address generation counter 191-1. Therefore, the occupancy α' directly after the writing becomes larger compared with the occupancy α4 just before by writing in the encoded data. When the data identification signal DID becomes "0" and the next block unit of encoded data is applied to the buffer memories 136-1 and 136-2, the write clock signal WT is applied to the buffer memory 136-2 and the address generation counter 191-2. Therefore, the occupancy β' directly after the writing becomes larger compared with the occupancy β2 just before.

These occupancies are applied as address signals to the conversion table 196 so that the set ratio corresponding to the applied occupancy is read out. In accordance with the set ratio read, the selector 134 selects the picture memory 133-1 or 133-2. As a result, the encoded data is transmitted by the set transmission ratio, and, even if the amount of the encoded data in block units differs, the buffer memories 136-1 and 136-2 are controlled so as not to overflow or underflow.

FIG. 21 is a diagram for explaining the change of the variable set ratio SR depending on the changes of the amounts of data stored in the buffer memories. As can be seen from the figure, the set ratio SR is increased when the occupancy α is decreased and the occupancy β is increased; and the set ratio SR is decreased when the occupancy α is increased and the occupancy β is decreased.

The above-described third embodiment shows the case of encoding in block units and transmission by switching in bit units in accordance with the predetermined transmission ratio, but it is also possible to transmit the encoded data in units of a plurality of bits so as to give the predetermined transmission ratio.

The afore-mentioned second and third embodiments showed the cases of provision of two television cameras, one for shooting the overview and the other for shooting a portion of the same, encoding the video signals for the overview and a portion of the same in block units, and transmitting by switching in accordance with the transmission ratio. However, it is also possible to provide three or more television cameras, encode the video signals for the overview and portions of the same in block units, and transmit by switching in accordance with respective transmission ratios. It is also possible on the reception side to enlarge and display a plurality of portions in the overview by the multiwindow method, where the overview is displayed in the same way as a static image and the various portions are displayed as moving images.

As explained above, the second and third embodiments of the present invention divides video signals of a plurality of television cameras, including a television camera which shoots the overview and television cameras which shoot portions of the overview, into blocks of a plurality of scanning lines and transmits by switching in block units in accordance with a transmission ratio between the overview video signals and the portion video signals. The video signals displayed as a moving image are transmitted in units of a plurality of blocks, while the video signals displayed as a static image is transmitted by units of one block, etc., so continuity of the video signals of the moving image is maintained and it is possible to improve the quality of the display of the moving image on the reception side.

Apart from the foregoing first to third embodiments of the present invention, there is a demand to display TV conferences wherein by combining and displaying an overview image and participant image, it is possible to simultaneously obtain a grasp of the atmosphere of the conference room and the expressions of the participants and it is possible to obtain a condition approximating a usual conference.

Figure 22A:
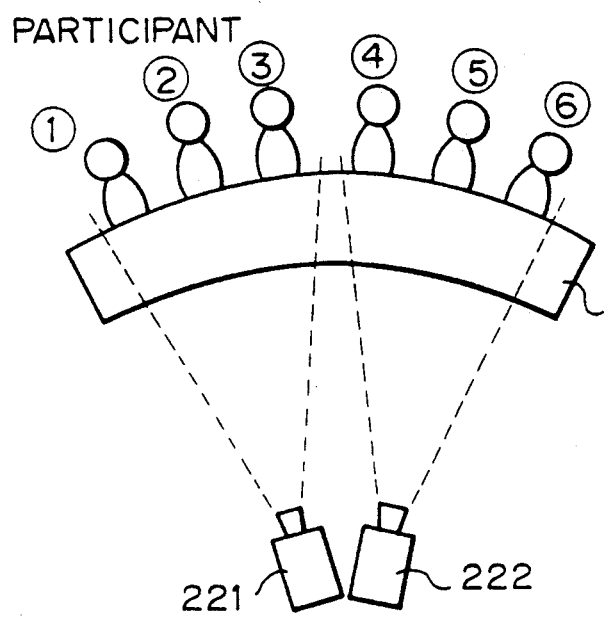
FIGS. 22A and 22B are diagrams for explaining the conventional display method for displaying a plurality of participants.
Figure 22B:
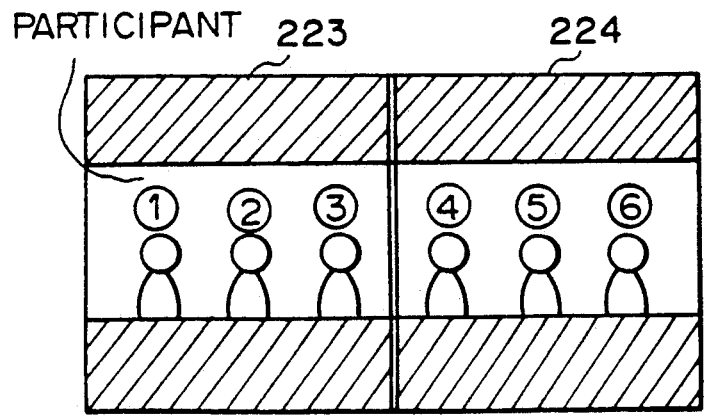

FIGS. 22A and 22B are views showing a conventional display method for TV conferences.

As shown in FIG. 22A, there are, for example, six participants ① to ⑥ in one conference room, a camera 221 shoots three of the participants, i.e., ① to ③, together, a camera 222 shoots three of the participants, i.e., ④ to ⑥, and together, the images are transmitted to the conference room of the opposite party where, as shown in 22B, the above participants ① to ③ and participants ④ to ⑥ are displayed simultaneously, on two adjacent monitors 223 and 224.

However, in the above conventional display method, one picture at the transmitting part is divided into two by the two cameras and the image of three participants is displayed on one monitor and the image of other three participants is displayed on another monitor. That is, the entire conference room is not displayed by one monitor. Therefore, there are problems in that it is difficult to convey the atmosphere of the conference room because there are too many participants on one display so that the space of the background is too small. In particular, since the background images of the two displayed pictures resemble each other, if the hues of the two pictures did not perfectly match, there would be a strong feeling of strangeness.

Therefore, the object of the fourth embodiment of the present invention is to provide a display method for a TV conference wherein by combining and displaying an overview image and a portion image such as a participant image, it is possible to simultaneously obtain a grasp of the atmosphere of the conference room and the expressions of the participants, and it is possible to obtain a condition approximating a usual conference.

Figure 23:
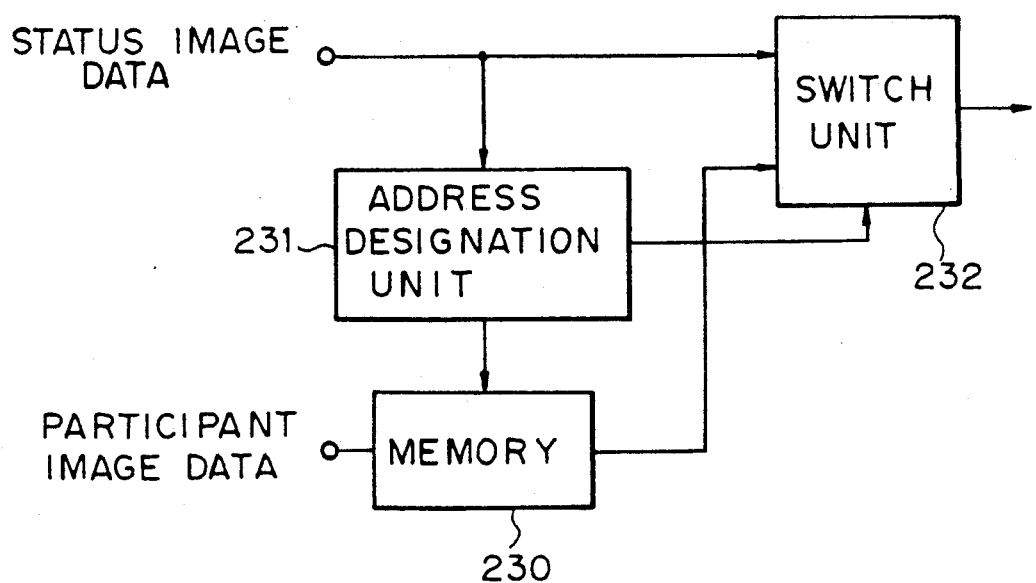
FIG. 23 is a block diagram showing a transmitting part in a television conference system according to a fourth embodiment of the present invention.

The above-mentioned problems are resolved by the circuit construction shown in FIG. 23. That is, in FIG. 23, in a transmission apparatus which transmits image data of a predetermined participant in a television conference which is constituted by a predetermined number of participants, connects remote areas by a telecommunications line, and uses microphones and televisions for the conference, 230 is a memory which stores participant image data of a participant at a predetermined address.

Reference numeral 231 is an address designation unit which extracts a synchronization signal from status image data of the status of the television conference, generates an address corresponding to the synchronization signal, reads the corresponding participant image data, and generates a control signal for allowing the participant image data to be output.

Reference numeral 232 is a switch unit which has two input terminals, receives as input at one input terminal the status image data, receives as input at the other input terminal the participant image data output read out from the memory 232, and outputs a predetermined one of the inputs in response to the control signal from the address designation unit 231.

During the time the participant image data read out at a predetermined speed from the memory 230 is applied to one of the input terminals of the switch unit 232, the participant image data from the memory 230 is output from the switch unit 232 in response to the control signal from the address designation unit 231.

In operation in FIG. 23, participant image data of a predetermined participant is stored in a predetermined address in the memory 230. Further, in the address designation unit 231, the synchronization signal is extracted from the status image data or, in other words, the overview shooting image data, of the status of the television conference, a predetermined address corresponding to the synchronization signal is generated, and the participant image data corresponding to the predetermined address is read out.

The status image data is input into one of the two input terminals of the switch unit 232. The participant image data read out from the memory 230 is input into the other. A predetermined one of the two from the switch unit 232 is output in response to the control signal.

During the time the participant image data read out at a predetermined speed from the memory 230 is applied to the predetermined input terminal of the switch unit 232, and the participant image data input from the memory 230 is output from the switch unit 232 in response to the control signal from the address designation unit 231.

When no participant image data is input in the switch unit 230, the status image data is output. As a result, on the reception side, the status image data and the participant image data may be combined and displayed as a single picture.

Figure 24A:
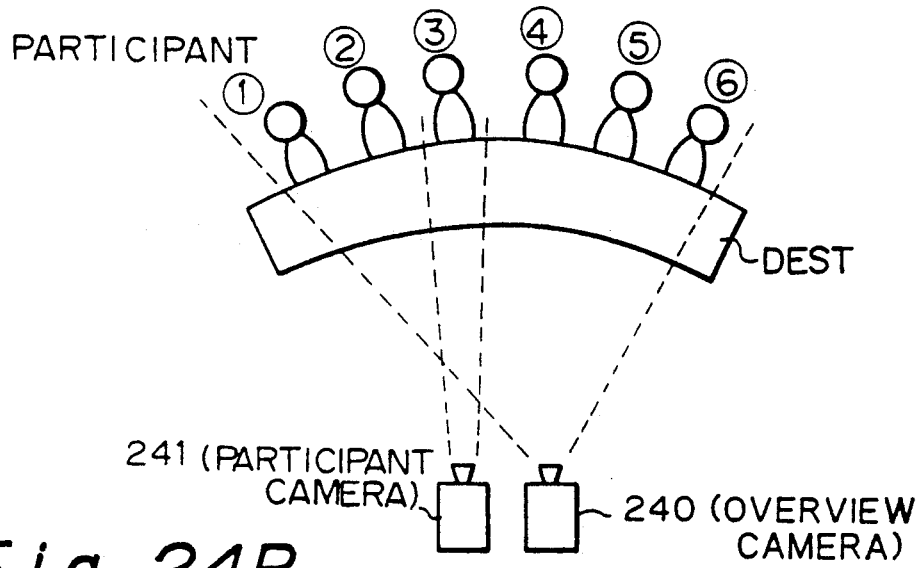
FIGS. 24A to 24C are diagrams for explaining the display method for displaying a plurality of participants according to the fourth embodiment of the present invention.
Figure 24B:
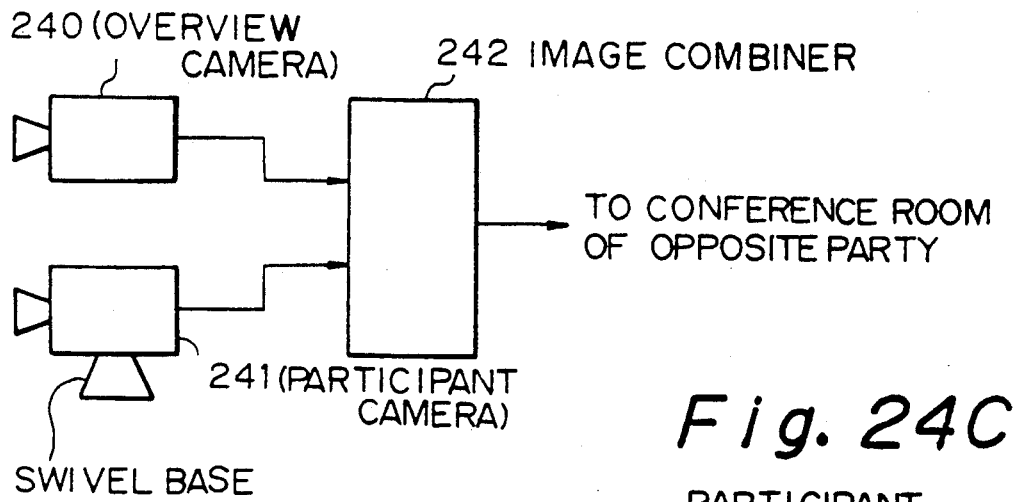
Figure 24C:
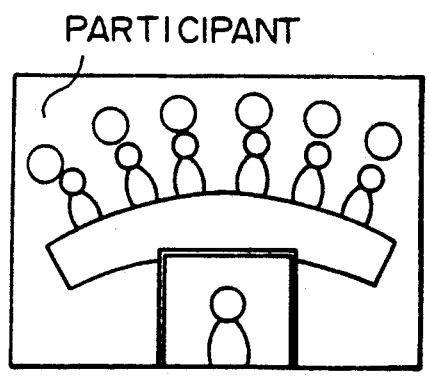

FIGS. 24A to 24C are views of the display method for a TV conference of the fourth embodiment of the present invention.

Figure 25:
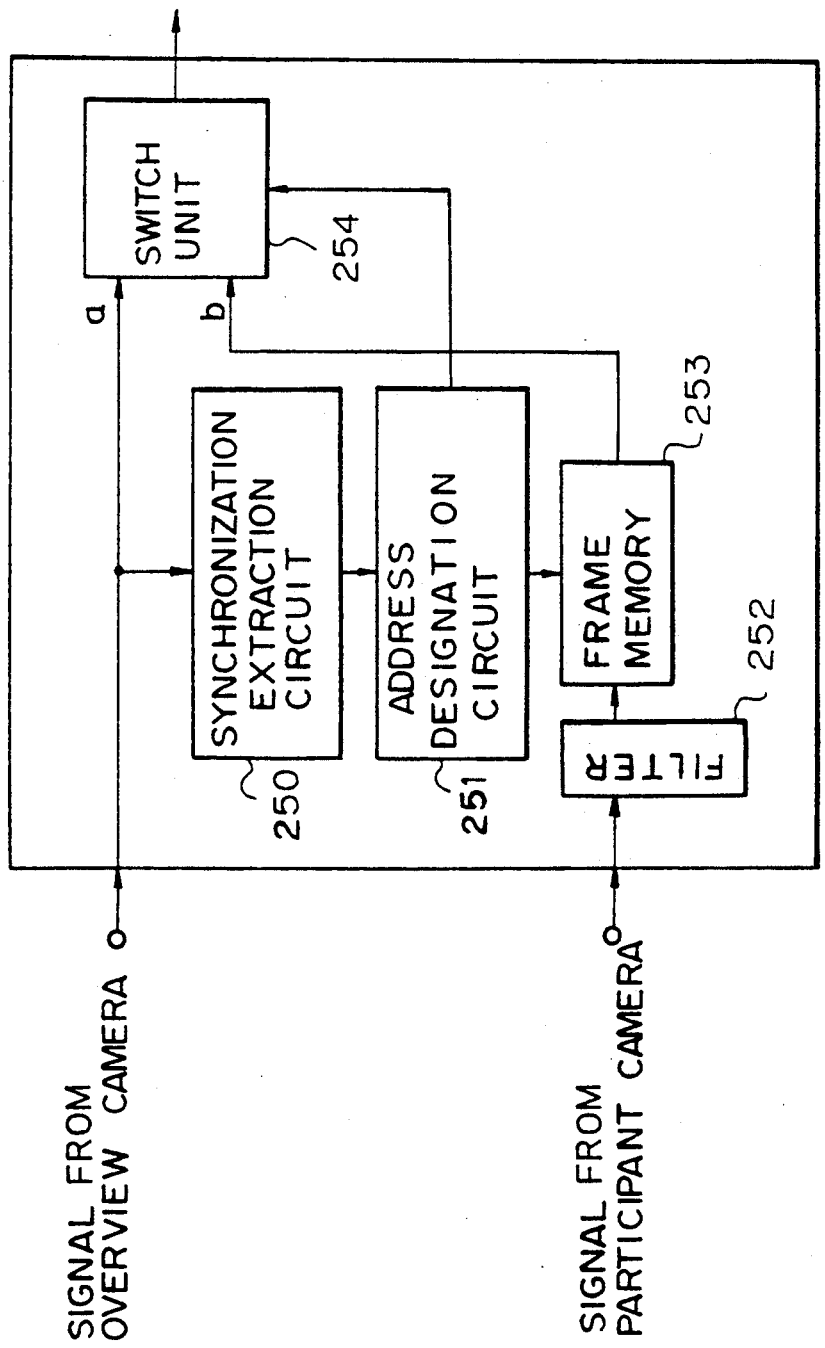
FIG. 25 a block diagram of an image combiner in the system shown in FIG. 24B.

FIG. 25 is a block diagram of the constitution of the image combiner used according to the fourth embodiment of the present invention.

Figure 26A:
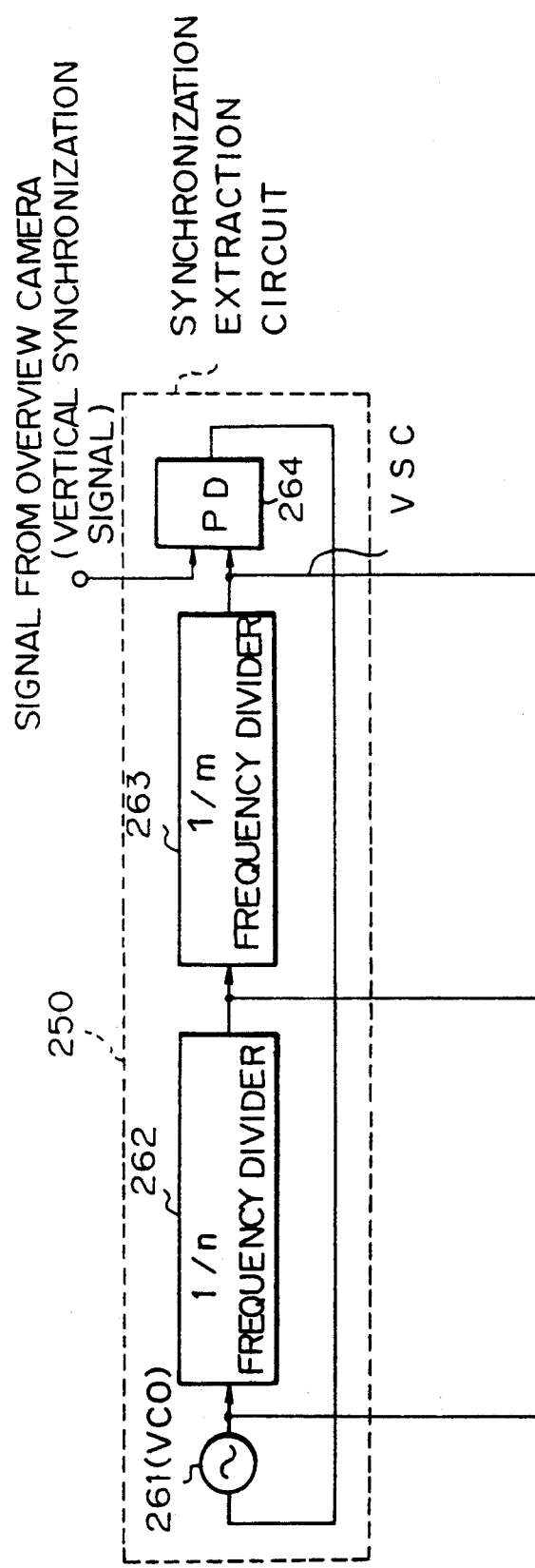
FIG. 26A and 26B is a block diagram of the constitution of the synchronization extraction circuit and address designation circuit used in the image combiner shown in FIG. 25.
Figure 26B:
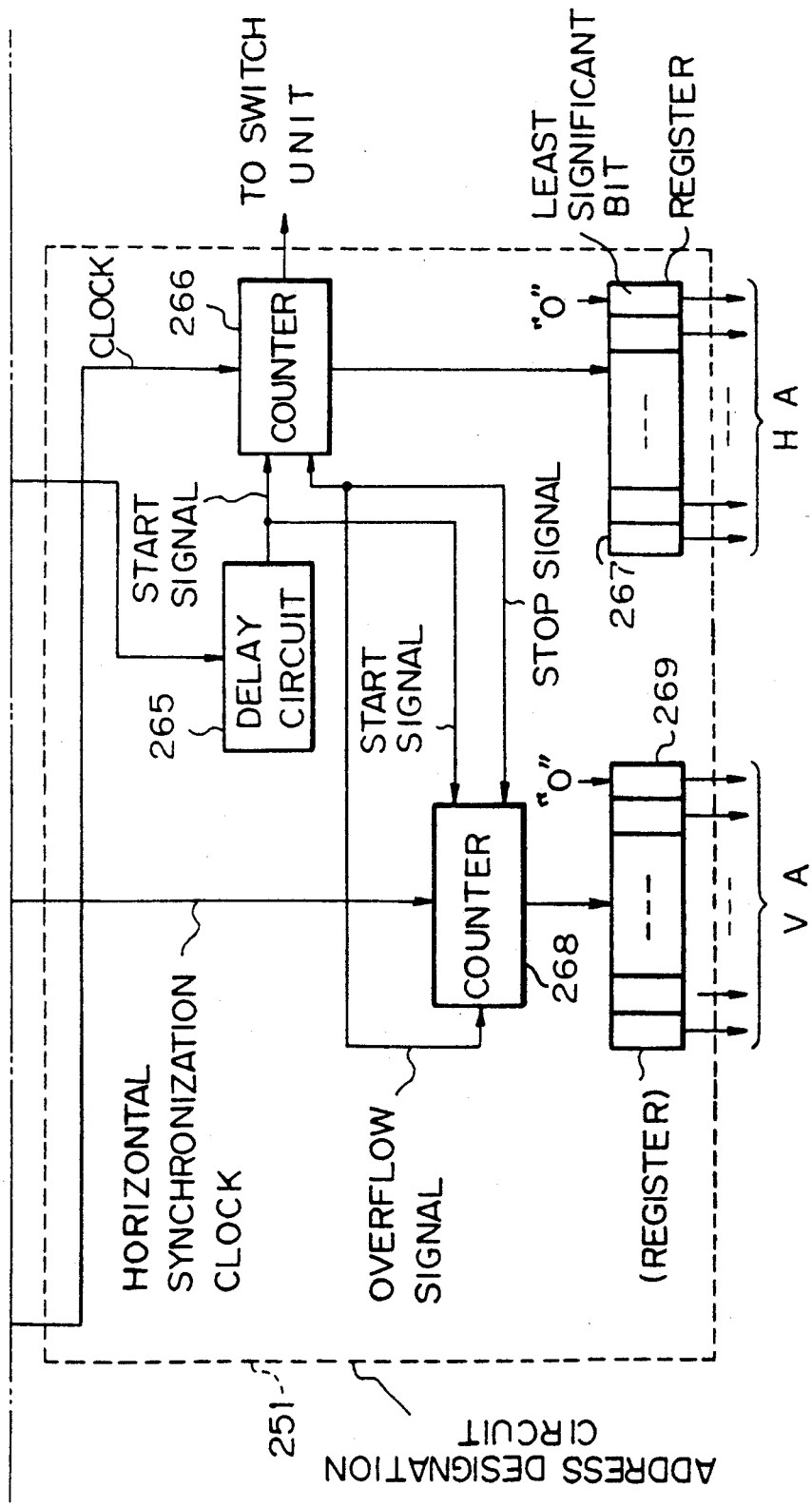

FIGS. 26A and 26B are block diagrams of the constitution of the synchronization extraction circuit and the address designation circuit used in the image combiner of the fourth embodiment.

FIG. 27A to 27D are views of the sampling of data of participant images inserted and combined in the picture in the fourth embodiment. Throughout the FIGS. 24A to 27D the same reference numerals show the same objects.

In FIGS. 24A to 24C, an overview camera 240 shoots the overall conference room, and a participant camera 241 shoots a closeup image of the participants, the participant shot being changeable by using the swivel base. As shown 24B, an image combiner 242 is used to combine the images from the above two cameras 240 and 241 as shown in FIG. 24C, the result being transmitted to the conference room of the opposite party.

Next, an explanation will be made of a circuit for realizing the above-mentioned display method.

The image taken by the overview camera 240 and the participant camera 241 shown in FIG. 24B is converted to digital data by an analog/digital converter (not shown in FIG. 24B) and input to the image combiner 242. In FIG. 25, the signal data from the overview camera 240 is input into an input terminal of a switch unit 254 and input into a synchronization extraction circuit 250.

The synchronization extraction circuit 250, as shown in FIG. 26A, is comprised of a voltage controlled oscillator (below referred to as VCO) 261, a 1/n frequency divider 262, a 1/m frequency divider 263, and a phase difference detection circuit (below referred to as a PD) 264. The frequency of the output of the VCO 261 is divided into 1/n by the 1/n frequency divider 262. Assuming now that the number of pixels of the picture in the horizontal direction is, for example, 600 (=n) and the number of pixels in the vertical direction is 500 (=m), a clock indicating the starting point in the horizontal direction (left end of picture) is output. This output clock is split and input into the 1/m frequency divider 263. The split clock is also input into a counter 268 in the address designation circuit 251 as a horizontal synchronization clock.

The clock input to the 1/m frequency divider 263 is further divided into 1/m. In the present case, since m=500, a vertical synchronization signal divided into 1/500 is obtained. This output is input into one of the input terminals of the PD 264. The output of the frequency divider 263 is also input into a delay circuit 265. The signal data from the overview camera (vertical synchronization signal) is input into the other input terminal of the PD 264. In the PD 264, the phase difference between the two inputs is found and is input into the VCO 261 as feedback so as to form a phase lock loop (PLL). As a result, a clock corresponding to the starting point (top left) of the scanning of the picture, synchronized with the signal data (vertical synchronization signal) from the overview camera is output from the 1/m frequency divider 263.

Figure 27A:
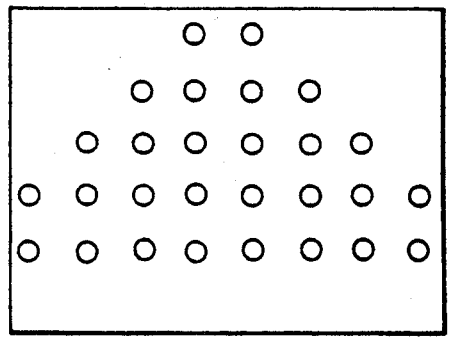
FIGS. 27A to 27D are diagrams for explaining the display according to the fourth embodiment of the present invention.
Figure 27B:
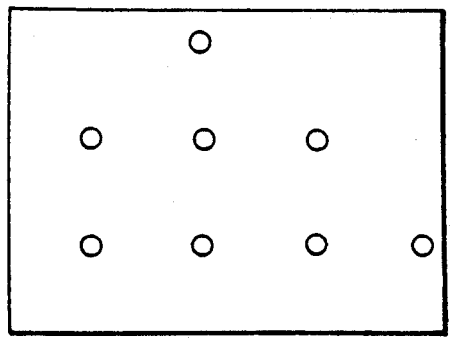
Figure 27C:
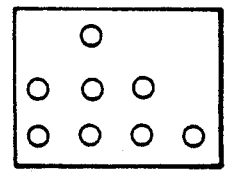
Figure 27D:
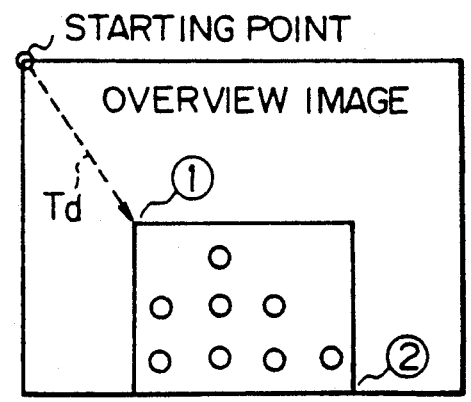

The above-mentioned output clock passes through a delay circuit 265 which provides a delay of exactly the desired time Td required for scanning from the starting point of the picture of the overview shown in FIG. 27D to the starting point ① of the frame of the participant inserted. The time Td may be any value so that the inserted frame of the participant may be positioned at any desired place in the picture of the overview. The delayed output clock is applied as a start signal to the counters 266 and 268.

The output of the VCO 261 in the synchronization extraction circuit 250 is applied to the counter 266 as a clock, whereby the scanning is performed successively from the top left of the picture displaying the overview shown in FIG. 27D in the horizontal direction, and from the top to the bottom, and the number of pixels is counted. The output of the counter 266 is transmitted as a control signal to the switch unit 254 shown in FIG. 25, so that the switch unit 254 selects the input side a of the signal data of the overview camera to be transmitted until a stop signal is input in the switch unit 254. Thus, the signal data from the overview camera is transmitted to the conference room of the opposite party. Simultaneously, the count is input from the counter 266 to a register 267. Here, by making the least significant bit of the register 267 "0", just the even number values of the binary numbers are stored in the register 267. In the current case, since the number of pixels in the horizontal direction is made 600, the above-mentioned register 267 is constituted by 10 bits. From this output, just the addresses corresponding to the pixels of the even numbers of addresses in the horizontal direction are extracted. The extracted addresses correspond to the signal data from the participant camera stored in the frame memory 253.

In the vertical direction also, when a start signal is applied to the counter 268 through the delay circuit 265, the count of the input clocks from the 1/n frequency divider 262 is started in the counter 268. The count is then input into a register 269 and, in the same way as the case of the register 267, the least significant bit is made "0", whereby just the even binary numbers are stored. Since the number of pixels in the vertical direction is made 500, the above-mentioned register is comprised of 9 bits. From this output, just the addresses corresponding to the pixels of the even numbers of a addresses in the vertical direction are extracted. The extracted addresses, correspond to the signal data from the participant camera in the frame memory 253.

The counters 266 and 268 are set so that they overflow to stop the count when the address corresponding to the pixel ②  is extracted, where the pixel ②  being the end point at the bottom right of the frame in which the participant image is inserted. Thus, the addresses of the frame memory 253 are extracted from the registers 267 and 269 and the data corresponding to the addresses is read out and added to the input terminal b of the switch unit 254. In this case, the readout from the frame memory 253 is performed in units of even numbers, but since the readout is continuous, the picture shrinks by one-half in both the vertical and horizontal directions as shown in FIG. 27C. The image data in the frame shown in FIG. 27D is transmitted to the conference room of the opposite party from the switch unit 254.

Further, when the signal data from the participant camera is not being read out from the frame memory 253, the signal data from the overview camera is transmitted through the switch unit 254 to the conference room of the opposite party.

As explained above, according to the fourth embodiment of the present invention, by combining and displaying an overview image and a participant image, it is possible to simultaneously obtain a grasp of the atmosphere of the conference room and the expressions of the participants, and it is possible to approximate a usual conference.

The fifth embodiment of the present invention relates to a control system which performs detection of speakers in a television conference system and automatically controls the camera.

Along with the spread of television conference systems nowadays, there has been an increase in use by people not well versed in the operation of the equipment. In such a case, greater sophistication of the man-machine interface is becoming an essential condition. In particular, there is a demand for automation of the functions of control of camera movement for recognition of the speaker and shooting the speaker.

The conventional art will be explained with reference to FIGS. 28A and 28B and FIGS. 29A to 29E.

Figure 28A:
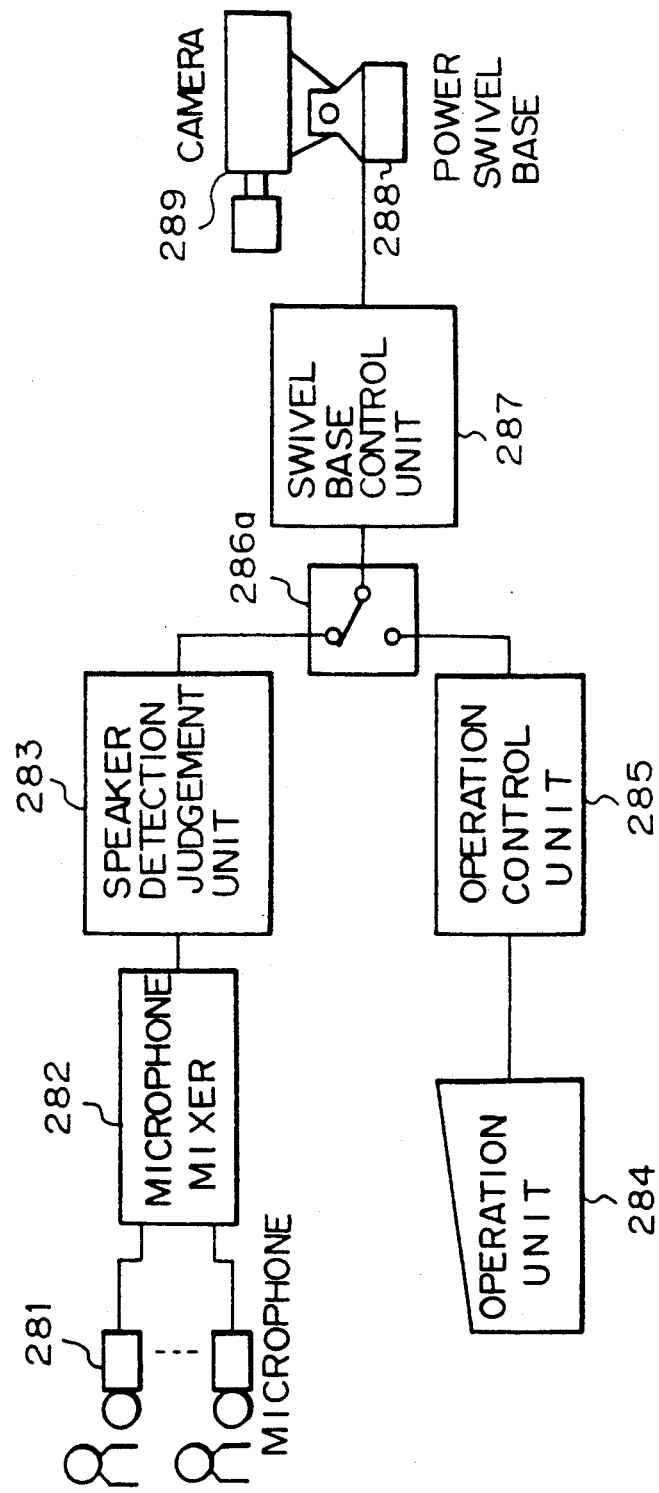
FIGS. 28A and 28B are diagrams of conventional speaker detection type control systems in a conventional television conference system.

In FIG. 28A, 281 shows a microphone, 282 a microphone mixer, 283 a speaker detection judgement unit, 284 an operation unit, 285 an operation control unit, 286 a changeover switch, 286b an OR gate, 287 a swivel base control unit, 288 a power swivel base, and 289 a camera.

Figure 28B:
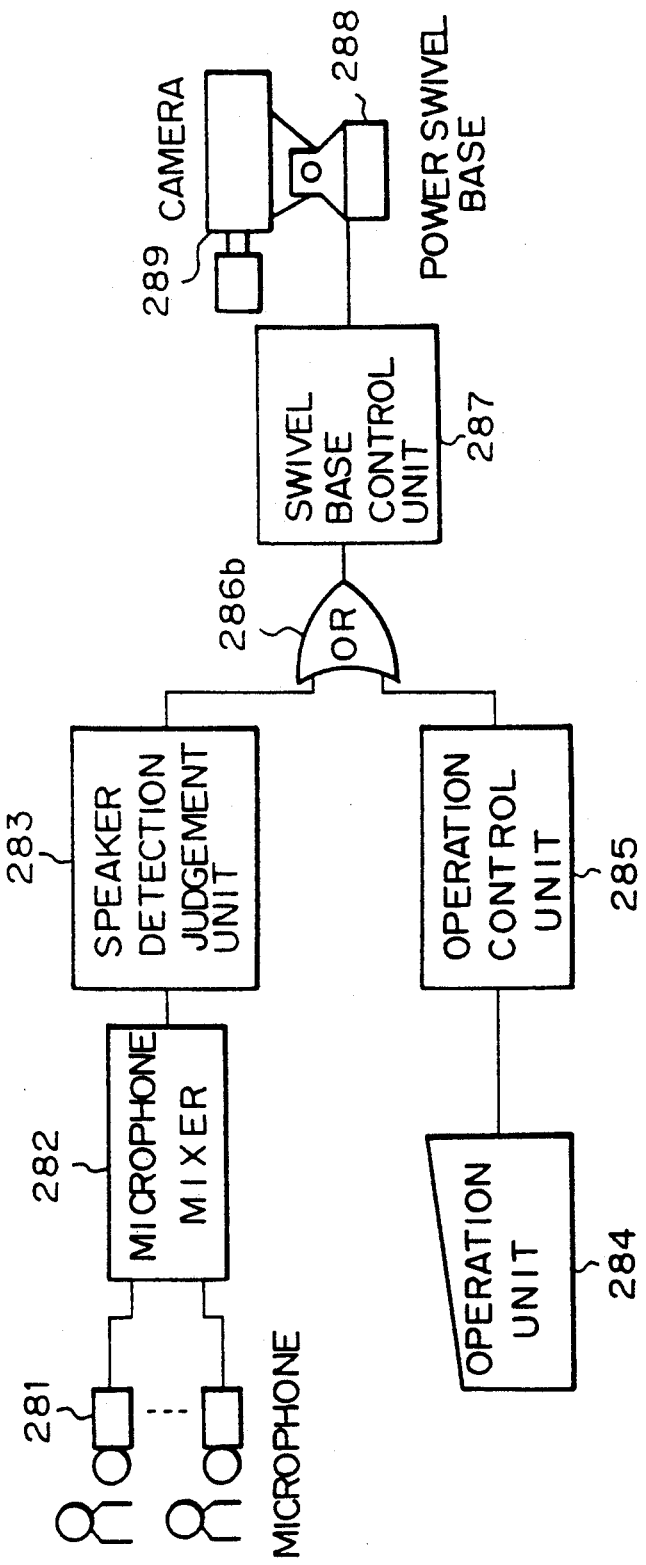

FIGS. 29A to 29E are time charts of the operation of the parts of FIG. 28A or 28B.

The conventional technique for detecting a speaker and performing automatic control was constituted by a mixture of a mode for speaker detection and automatic control and a mode for manual control. FIG. 28A shows the control by switching between the automatic control mode and the manual control mode.

The voices of the speakers are detected by the microphones 281 (FIG. 29A). The information from the plurality of microphones 281 is input into the microphone mixer 282, which outputs a signal formed by mixing the input sounds and a signal indicating into which microphone 1 a sound was input.

In the speaker detection judgement unit 283, it is detected if the audio signal of the microphone mixer 282 is from voices due to conversation, sneezing, coughing, or other singly occurring sounds or noise from the outside. In the case of voices, the output of the microphone mixer is output (FIG. 29B). In the case of singly occurring sounds and noise from the outside, the output of the microphone mixer 282 is not output.

The input for manual control is performed by the operation unit 284. The signal from the operation unit 284 (FIG. 29C) is converted by the operation control unit 285 to a signal for selecting one of the speakers and a signal for fine adjustment of the camera position.

The outputs of the speaker detection judgement unit 283 and the operation control unit 285 are input to the changeover switch 286a. One of the outputs of the speaker detection judgement unit 283 and the operation control unit 285 is input to the swivel base control unit 287 by switching the switch from the outside.

The swivel base control unit 287 generates a drive signal corresponding to the outputs of the speaker detection judgement unit 283 and the operation control unit 285 to drive the camera 289 by the power swivel base 288 (FIG. 29D).

FIG. 28B shows similar treatment for the automatic control mode and the manual control mode. The difference in constitution from FIG. 28A is that instead of the changeover switch 286a, use is made of an OR circuit 286b for simultaneous control of the detection judgement unit 283 and the operation control unit 285.

In the apparatus of FIG. 28A, during the automatic control mode, there is the defect that as shown in FIG. 29E, fine adjustment is not possible in the case of a deviation between the picture being shot and the position of the speaker.

In the case of FIG. 28B, the shooting is by the automatic control mode and, as shown in FIG. 29E, when there is a deviation between the speaker and the picture being shot, the operation unit 284 may be used for control so that fine adjustment may be performed and the speaker may be positioned at the center of the picture. However, if the voice of the speaker is cut off after the fine adjustment, there is a problem in that the control position of the camera resets and the position of the speaker deviates with respect to the picture being shot.

Further, even if a person other than the speaker is shot using the operation unit 284, there is the problem that the speaker ends up being shot by the input of the automatic control mode.

Figure 30:
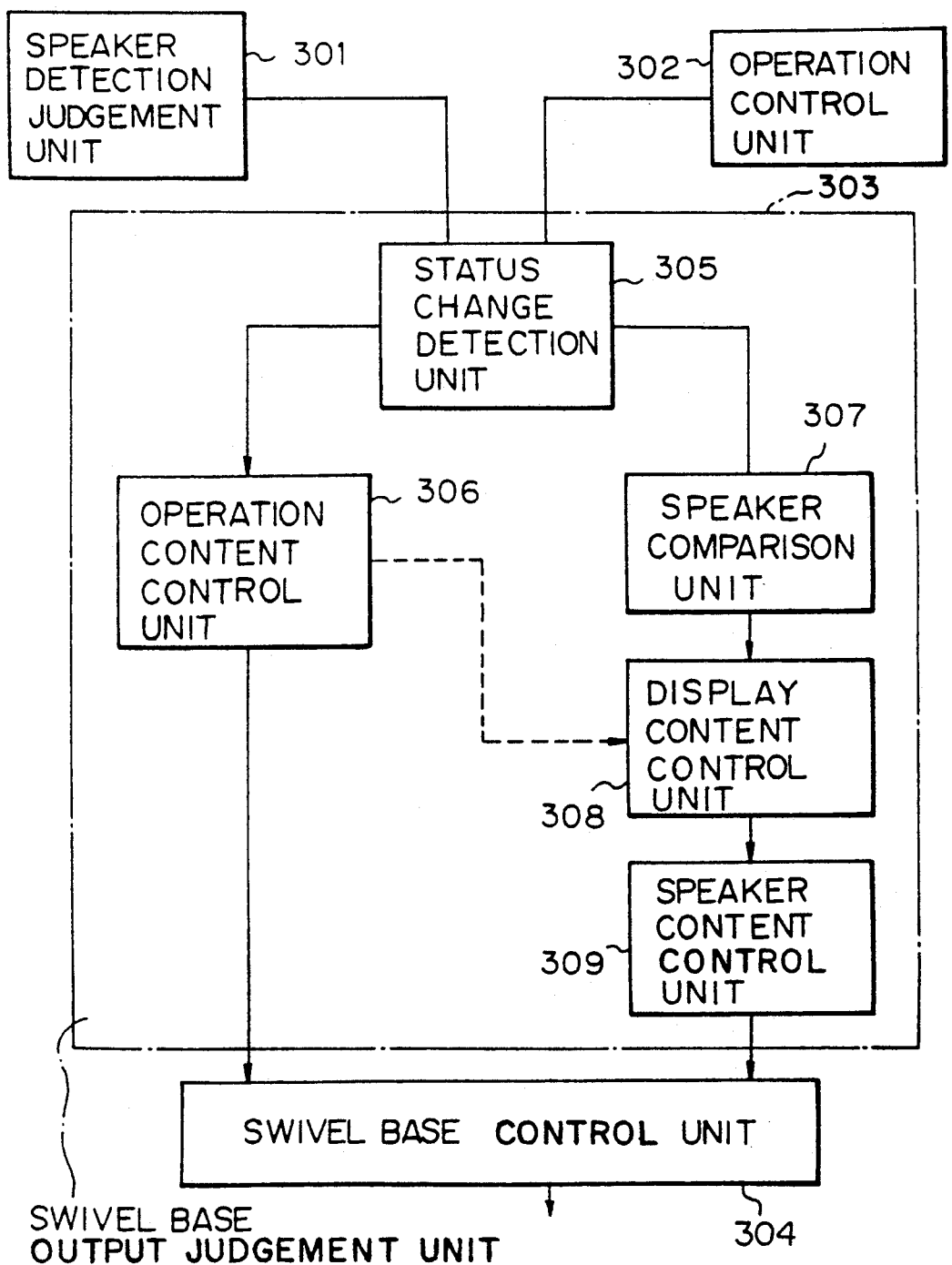
FIG. 30 is a block diagram of a swivel base output judgement unit in a television conference system according to a fifth embodiment of the present invention.

According to the fifth embodiment of the present invention, there is provided a television conference system as shown in FIG. 30, wherein the system has a speaker detection judgement unit 301 which detects the speaker and outputs position information of the speaker, an operation control unit 302 for performing manual operation, a swivel base control unit 304 which controls a swivel base in response to the output of the said speaker detection judgement means 301 or the operation control unit 302 and which performs directional control of a camera, and a swivel base output judgement unit 303 which includes:

a status change detection unit 305 which detects status changes in the output of the speaker detection judgement unit 301 and in the output of the operation control unit 302; an operation content control unit 306 which performs control over the operation content when a signal from the operation control unit 302 is detected by the status change detection unit 305; a speaker comparison unit 307 which performs a comparison of the speakers detected by the speaker detection judgement unit 301 a previous time and the speaker information which is input when a signal of the speaker detection judgement unit is detected by the status change unit; a display content control unit 308 which monitors the control content from the operation content control unit 306, and blocks information from the speaker detection judgement unit 301 when the operation content control unit 306 is operating; and a speaker content control unit 309 which performs control over the signal information from the display content control unit 308. The swivel base output judgement unit 303 is provided between the speaker detection judgement unit 301 and the operation control unit 302 and the swivel base control unit 304.

In operation, the swivel base output judgement unit 303 receives as its input the position information of a speaker output from the speaker detection judgement unit 301 and, if the advance is the same as the position information last input from the speaker detection judgement unit 301, does not perform any control, so the picture finely adjusted by the operation control due to deviation of the speaker and position shot is displayed as it is.

Further, during the operation, since the output from the speaker detection judgement unit 301 is forcibly cut off, even when a person other than the speaker is to be shot by the operation control unit 302, it is possible to eliminate shooting of the speaker due to input of the automatic control mode.

Figure 31:
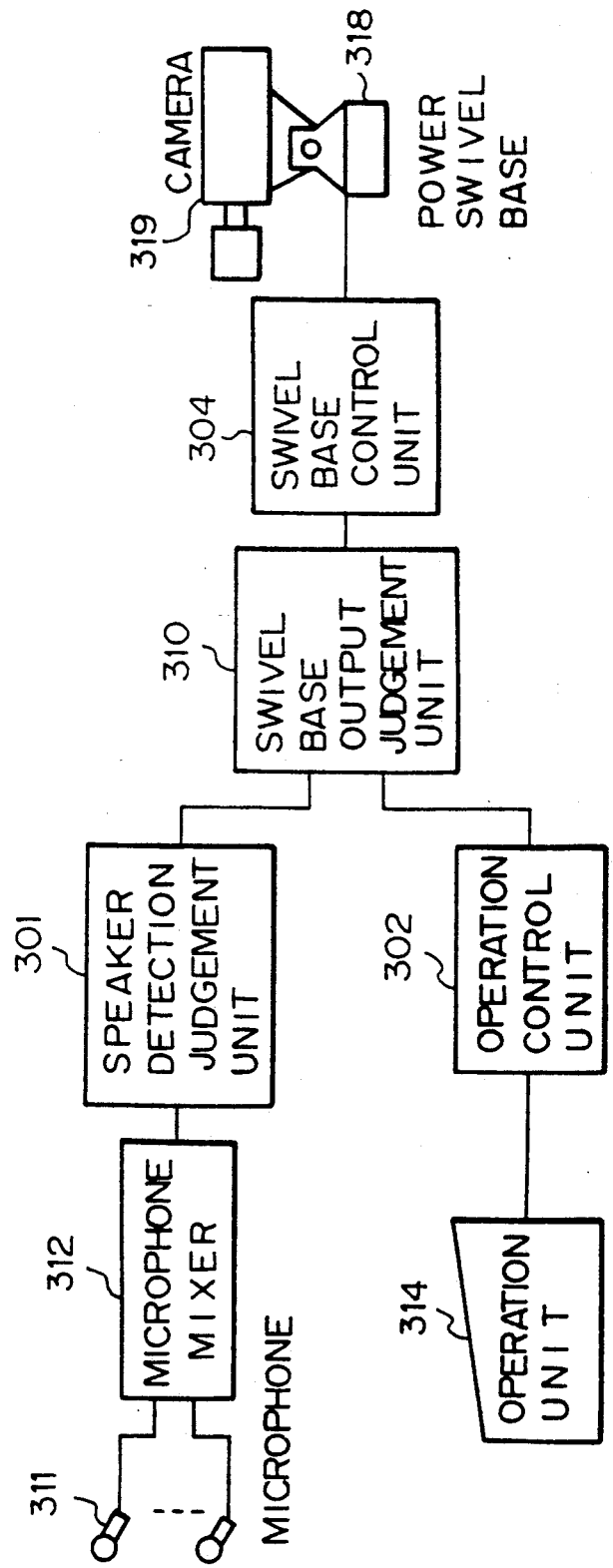
FIG. 31 is a block diagram of a speaker detection control system in the television conference system according to the fifth embodiment of the present invention.

FIG. 31 shows the overall constitution of the television conference system according to the fifth embodiment of the present invention.

In FIG. 31, 310 shows the swivel base output judgement unit. Parts which are the same as in FIG. 30 are shown by the same reference numerals. Provision is made of a swivel base output judgement unit 310 which receives as input the swivel base operation signals output from the speaker detection judgement unit 301 and the operation control unit 302 and outputs a signal to the swivel base control unit 304 in accordance with the status of these input signals.

Figure 32:
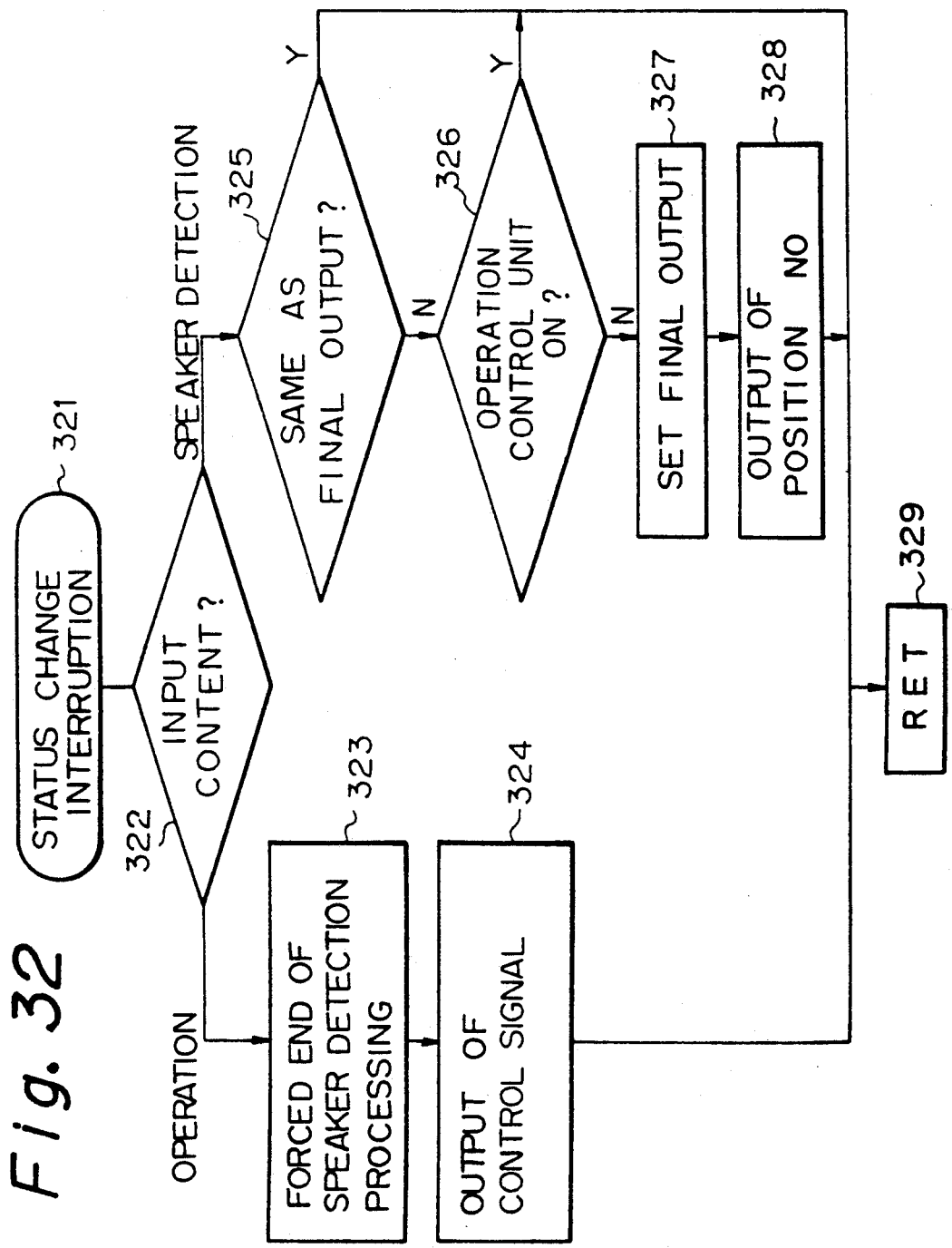
FIG. 32 is a flowchart for explaining the operation of the system shown in FIG. 31.

The swivel base output judgement unit 310 operates by software processing. The control of the same is shown in the flow chart of the operation of FIG. 32.

In step 321, the information input from the speaker detection judgement unit 301 or the operation control unit 302 in FIG. 31 is detected.

In step 322, judgement is made whether the result of the detection is the output of the speaker detection judgement unit 301 or the output of the operation control unit 302.

In step 323, when the result of the detection is the output of the operation control unit 302, the processing currently being performed (automatic control processing) is forcibly stopped. Then in step 324, the control signal for driving the camera 319 is output from the operation control unit 302 to the swivel base control unit 304.

In step 325, a comparison is made of the previous information of the speaker detection judgement unit 301 and the information input from the speaker detection judgement unit 301. If the result is that it is the same as the previous information of the speaker detection judgement unit 301, no control is performed (step 329).

In step 326, it is detected if the control of the operation control unit 302 is in operation, and if in operation, no control is performed (step 329).

In step 327, if the operation control unit 302 is not operating in step 326, the position information input from the speaker detection judgement unit 301 is set. In step 328, the position information set in step 327 is output to the swivel base control unit 304.

A specific example of the case of such control will be explained using the time chart of FIGS. 33A to 33F.

If there is an output (FIG. 33A) from the microphone 311, the speaker identified by the output (FIG. 33B) of the speaker detection judgement unit 301 is recognized and the position information is sent out.

In the swivel base output judgement unit 310, the output (FIG. 33C) of the operation control unit 302 is not input, so control is performed by the speaker detection judgement unit 301.

The power swivel base 318 operates as shown in FIG. 33E under control of the swivel base control unit 304 and a picture is obtained by the designation of the position information such as of the picture to be shot (FIG. 33F). At this time, as shown in the shot picture FIG. 33F, if the speaker deviates from the picture position, information (FIG. 33C) for fine adjustment of the camera is sent out from the operation control unit 284.

In response, the swivel base output judgement unit 310 operates again as shown in FIG. 33D, control by the speaker detection judgement unit 301 is stopped, and control by the operation control unit 302 is performed. Therefore, since the output is the output (FIG. 33D) from the swivel base control unit 304, the power swivel base 318 performs the time operation of FIG. 33E and the speaker enters the center of the picture finely adjusted as in FIG. 33F.

When the output (FIG. 33A) of the microphone 311 is subsequently cut off and the speaker is again detected, the speaker is recognized as shown by the output (FIG. 33B) of the speaker detection judgement unit 301 and the position information is input to the swivel base output judgement unit 310. In the swivel base output judgement unit 310, as shown by the output (FIG. 33D) of the swivel base output judgement unit 310, the position information is the same as the previous time, so no control is performed.

Due to this type of control, the operation is effected by the designation of the position information, and it is possible to eliminate the automatic control so that the manually set position is not over ridden.

According to the fifth embodiment of the present invention, when a camera is controlled by a mixture of automatic control and manual control, priority is given to manual control rather than automatic control, so it becomes possible to eliminate wasteful switching of cameras and automatic control overriding the manual operation.

The sixth embodiment of the present invention relates to a television conference system having a transmission picture monitor and a reception picture monitor for displaying a transmission picture and a reception picture, respectively, shot by a group of moving image shooting cameras and a document shooting camera.

In a television conference system, it is important how to deal with an image obtained by shooting or directing cameras documents which constitute important elements of the conference.

As a well known conventional television conference system which deals with documents, there is a system shown in FIG. 1. In the television conference system shown in FIG. 1, when a conference is to be carried out, the relationship between the transmission monitor 4 in one conference room and the reception monitor 5 in another conference room is as shown in FIGS. 34A to 34C.

Figures 34A, 34B, 34C:
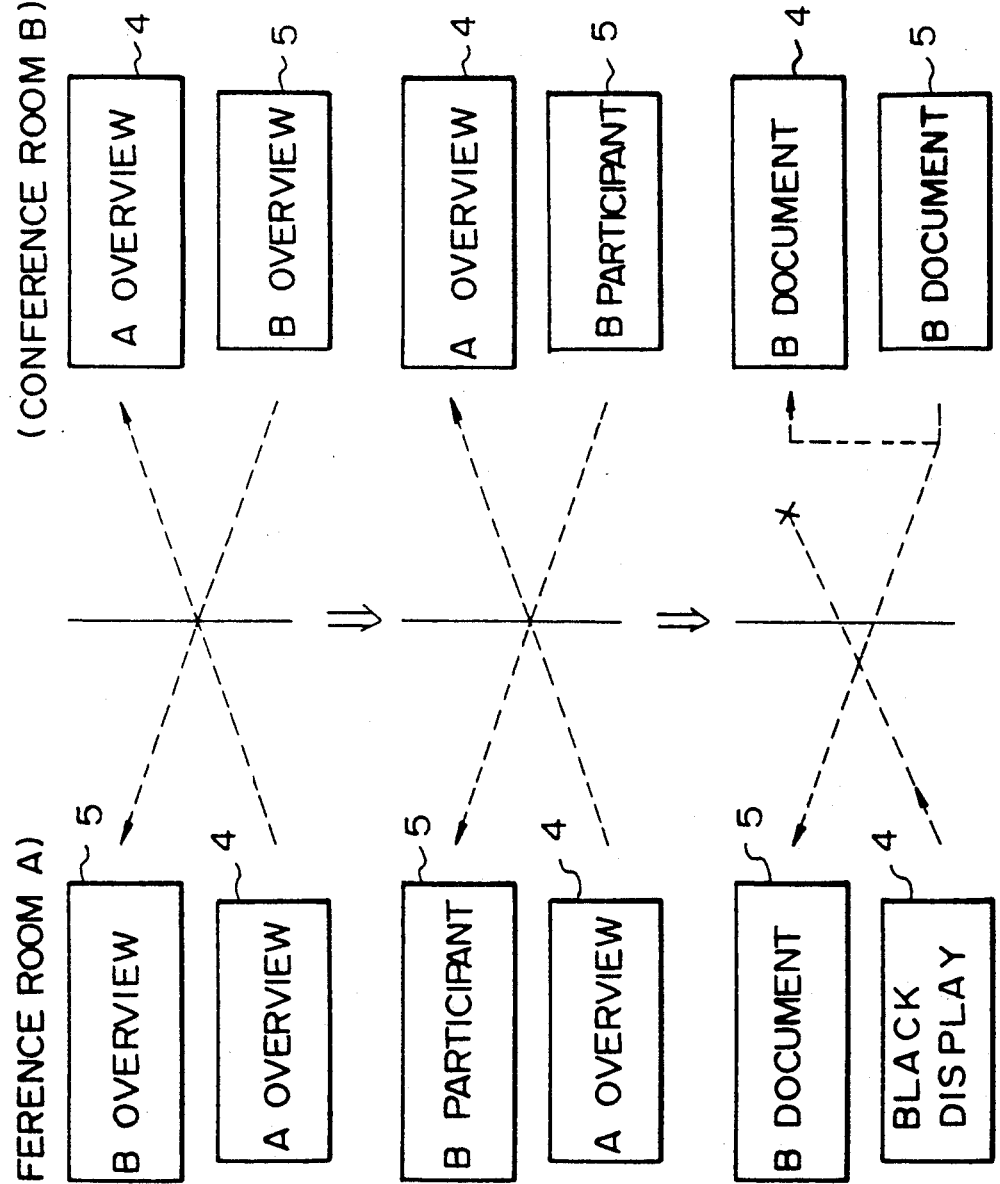
FIG. 34A to 34C are diagrams for explaining a transmission display and a reception display according in the conventional art and according to a sixth embodiment of the present invention.

Referring to FIG. 34A, an image obtained by shooting an overview in one conference room, for example, A, by the overview shooting camera 1a is displayed on the reception monitor 5 in the opposite-party conference room B as well as on the transmission monitor 4 in the transmission-party conference room A. Also, the overview image of the conference room B is displayed on the reception monitor 5 in the conference room A and displayed on the transmission monitor 4 in the conference room B.

Referring to FIG. 34B, an overview image of the conference room A is displayed on the reception monitor 5 in the room B and on the transmission monitor 4 in the transmission room A. Also, a participant image in the room B is displayed on the reception monitor 4 in the room A and on the transmission monitor 5 in the room B.

In such a television conference system, since the document camera is also under the control of the opposite party, when there is a difference between the documents set in one's own station and the documents desired by the opposite party, there was a problem of a delay in the proceedings of the conference.

Further, as shown in FIGS. 34A to 34C, the transmission monitor 4 used is usually compact since it is to be used only for rough confirmation of the image sent to the conference room of the opposite party. With respect to the image of documents, however, it is necessary to precisely view the monitor image in the conference room of the transmission side as well.

Since the transmission monitor is small in size, there is a problem in that the persons participating in the conference cannot easily view the document image on the transmission monitor. If use is made of a large sized transmission monitor as well in such a case, there would be a problem of higher costs.

Therefore, the sixth embodiment of the present invention has as its object the provision of a television conference system which can display transmission images and reception images from a moving image camera group and document camera by an image control unit on both a transmission monitor and a reception monitor wherein, even at the conference room of the transmission side, and it is possible to control the transmission image of the documents and monitor the same clearly.

Figure 35:
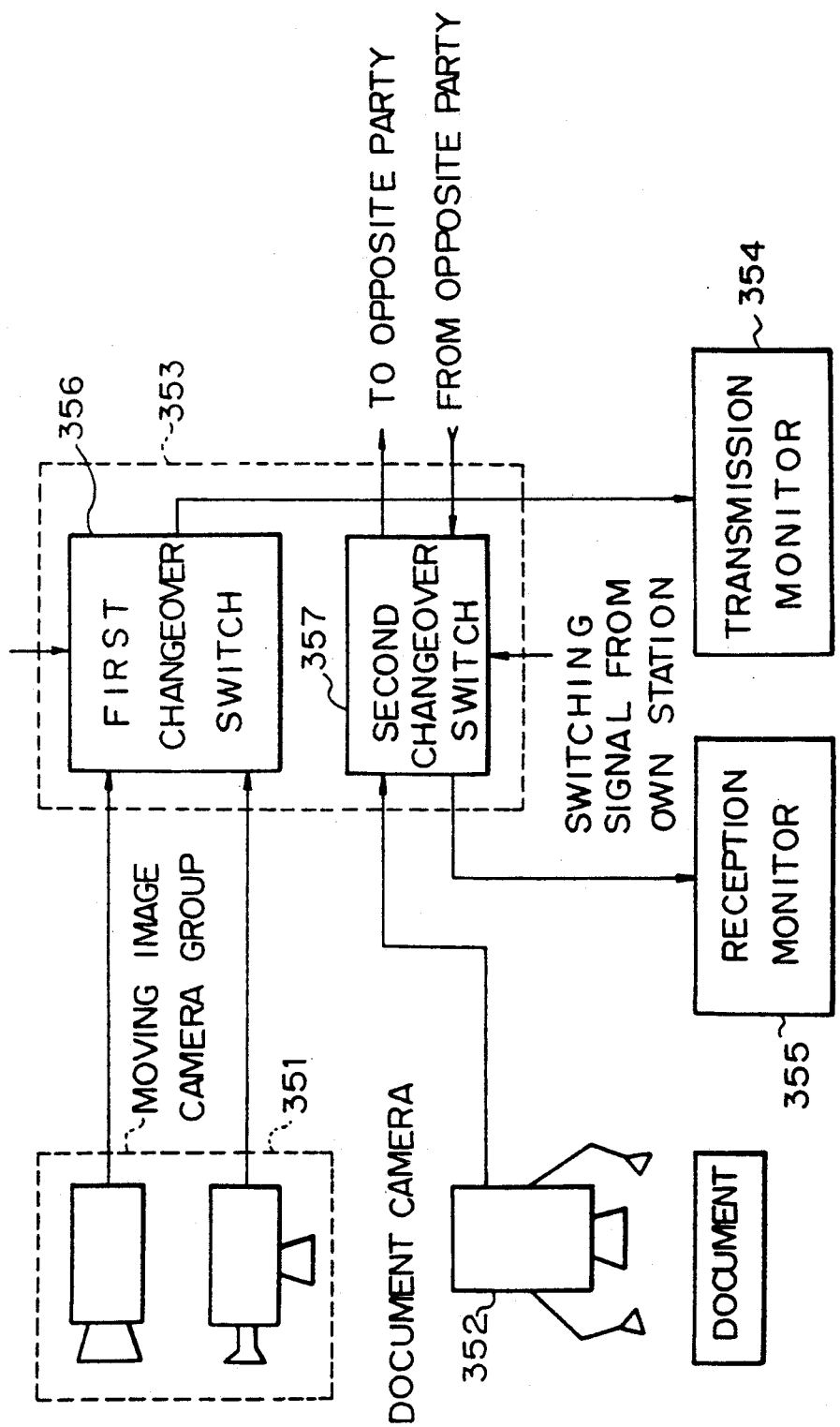
FIG. 35 is a block diagram of a television conference system according to the sixth embodiment of the present invention.

To achieve the above-mentioned object, in the television conference system according to the sixth embodiment of the present invention, as shown by the principle view of FIG. 35, an image control unit 353 includes a first changeover switch 356 which switches cameras in the moving image camera group 351 in the conference rooms in response to a switching signal from an opposite party, and a second changeover switch 357 which switches so that an image of the document camera 352 is displayed on the reception monitors 355 in the opposite party and one's own station in response to a switching signal from one's own station, and does not display the image from the opposite party on the reception monitor 355 of one's own station.

In operation, in the television conference system shown in FIG. 35, in the case of a moving image transmission as shown in FIGS. 34A and 34B, usually, the first changeover switch 356 is controlled by a switching signal from the opposite party, one of the camera group 351 is selected, the image is transmitted, and the image is displayed on the reception monitor 355 of the conference room of the opposite party and displayed on the transmission monitor 354 of the conference room of one's own station.

As shown in FIG. 34C, when a document image is, for example, transmitted from the conference room B to the conference room A, the image of the document camera 352 is displayed on the reception monitor 355 in the conference room A and the transmission monitor 354 in the conference room B and is displayed on the reception monitor 355 in the conference room B of the transmission side by switching of the second changeover switch 357 by the switching signal of one's own station. In this case, even if the image of the conference room A is sent to the conference room B, it is not displayed on the reception monitor 355 in the conference room B by the switching control of the second changeover switch 357.

In this way, in the case of transmission of a document image, it is possible to control things so that the image is displayed on the large sized reception monitor at one's own station as well.

Below, a detailed explanation will be made of the sixth embodiment of the television conference system.

Figure 36:
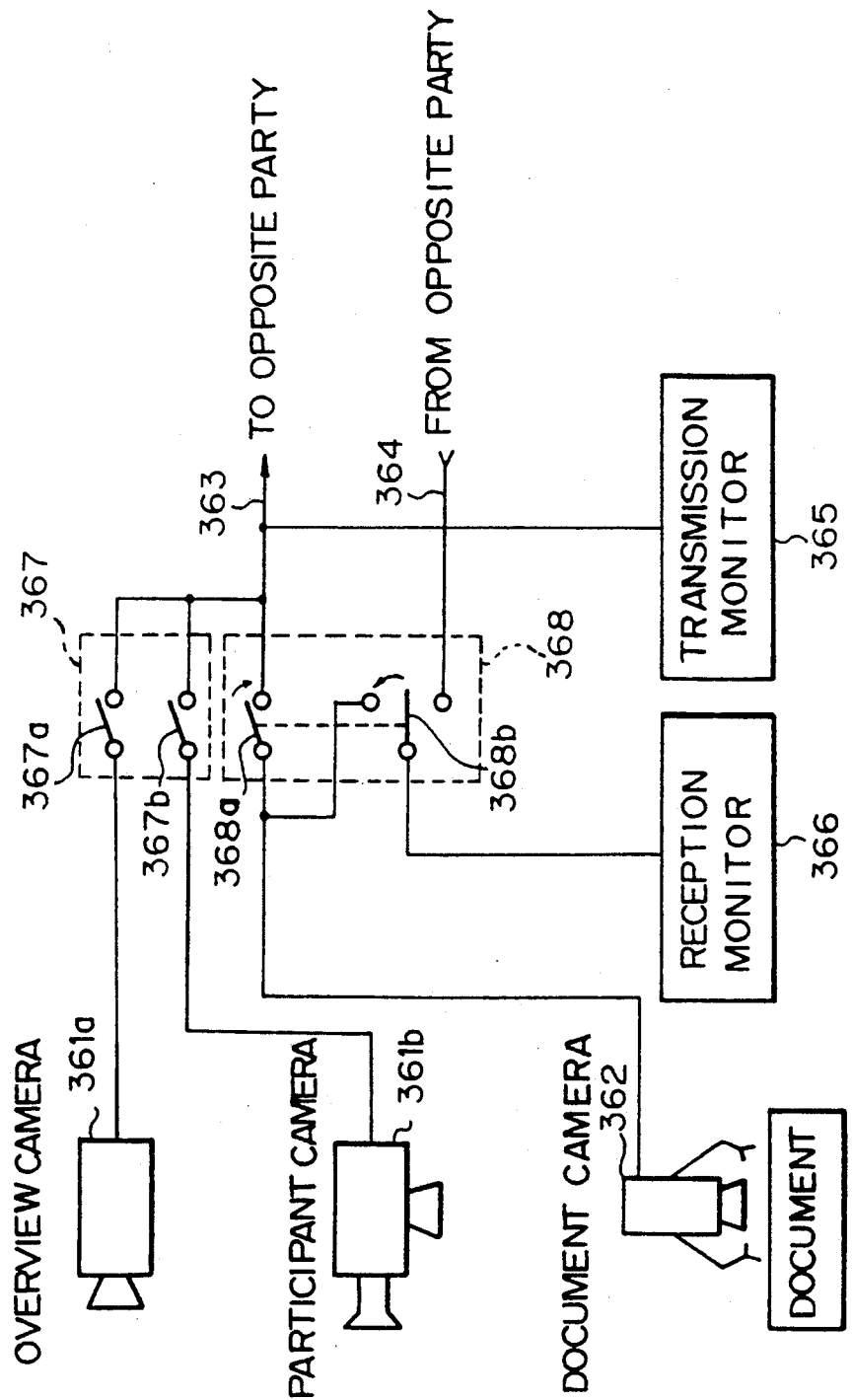
FIG. 36 is a detailed diagram of the system shown in FIG. 35.

FIG. 36 shows the constitution of one party in the television conference system according to the sixth embodiment. In FIG. 36, a first changeover switch 367 includes switch contacts 367a and 367b connected between an overview camera 361a and a participant camera 361b, and a transmission line 363. A second changeover switch 368 is constituted by switch contacts 368a and 368b, the contact 368a connecting the document camera 362 and the transmission line 363. The moving contact 368b is connected to a reception monitor 366. Fixed contact of the second changeover switch 368 is connected to the document camera 362. The other fixed contact is connected to the reception line 364. The contacts 368a and 368b are designed to interlock in the direction indicated by the arrows.

If the constitution of FIG. 36 is used as that of the conference room A (exactly the same as that used for the conference room B), during transmission of a normal moving image, the switching control signal from the conference room B of the opposite party is applied through the image control unit 3 (see FIG. 1) to the first changeover switch 367. By this, for example, the contact 367b of FIG. 36 is selected, and, as shown in FIG. 34B, the image of the participant camera 361b is transmitted through the transmission line 363 to the conference room B. Simultaneously, the image is also displayed on the small sized transmission monitor 365 in the conference room A.

At this time, the second changeover switch 368 in the conference room B is switched for connection of the reception line 364 and the reception monitor 366 in the conference room B. Therefore, the image transmitted to the conference room B is displayed on the large sized reception monitor 366.

On the other hand, during transmission of a document image, the switching signal from the operational device 10 (see FIG. 1) of one's own station, for example, the conference room A, is used to close the contact 368a of the second changeover switch 368 and the contact 368b is switched to the side of the document camera 362. Therefore, the document image from the document camera 362 is displayed on the transmission monitor 365 and the reception monitor 366 in the conference room A. Thus, the document image, as shown in FIG. 34C, is displayed on the large sized reception monitor 366 in the conference room A. However, the transmission image of the conference room B of the opposite party is blocked by the second changeover switch 368 in the conference room A and is never sent to the reception monitor 366 in the conference room A.

As mentioned above, according to the television conference system of the sixth embodiment, when one's own station is controlling the document camera and a document image is being transmitted to the conference room of an opposite party, the changeover switch provided in the image control unit is used for changeover control to not only display the document image at the transmission monitor of one's own station, but also to display the same document image at the reception monitor of the same one's own station, so it is possible to monitor an excellent document image by a usual large sized reception monitor even at one's own conference room, and it is possible to smoothly and quickly proceed with the conference.

From the foregoing description of the preferred embodiments, it will be apparent that, according to the present invention, an improved television conference system can be provided in which various effects are obtained so that the specification of the speaker can be performed extremely accurately, the noise in determining the speaker can be eliminated, a moving image can be displayed without imparting a strangeness to the feeling of the conference even in the transmission of multiple pictures, an overview image and a participant image are effectively combined and displayed so that a state close to a usual conference can be displayed, priority is given to control by manual operation of a camera rather than automatic control so that wasteful switching of cameras can be eliminated, and an excellent document image can be monitored by the transmission party on a usual large sized reception monitor.

What is claimed is:

1. A television conference system for automatically shooting a current speaker of a plurality of speakers with a camera, comprising:
   microphone input judgement means for judging existence of microphone inputs into microphones provided for each of the speakers;
   judgement result holding means for holding the results of the judging of the existence of the microphone inputs over a first predetermined period, the first predetermined period being longer than the shortest period of continuous speaking, said judgement result holding means including a plurality of storage buffers, the number of the storage buffers being the same as the number of samplings in the first predetermined period, and the storage buffers being ring shift registers;
   time totaling means for obtaining a total time of the microphone inputs during the first predetermined period from the results of the judging held in said judgement resulting holding means;
   speaker specifying means for specifying as a current speaker the speaker using the microphone input having the total time obtained by said time totaling means over a second predetermined period, the second predetermined period being a predetermined continuing period of noise; and
   camera drive means for driving a camera within a shooting range of the speaker specified as the current speaker by said speaker specifying means.

2. A television conference system for automatically shooting a current speaker of a plurality of speakers with a camera, comprising:
   microphone input judgement means for judging existence of microphone inputs into microphones provided for each of the speakers;
   judgement result holding means for holding the results of the judging of the existence of the microphone inputs over a first predetermined period, the first predetermined period being longer than the shortest period of continuous speaking;
   time totaling means for obtaining a total time of the microphone inputs during the first predetermined period from the results of the judging held in said judgement result holding means;
   speaker specifying means for specifying as a current speaker the speaker using the microphone input having the total time obtained by said time totaling means over a second predetermined period, the second predetermined period being a standard continuing period of noise; and
   camera drive means for driving a camera within a shooting range of the speaker specified as the current speaker by said speaker specifying means;
   calculation means for calculating a number of microphone inputs with the total time found by said time totaling means over a preset time, and
   said speaker specifying means including selection means for selecting, from the speakers corresponding to the number of microphone inputs calculated by said calculation means, as the current speaker the speaker for which the total time is the longest.

3. A television conference system for automatically shooting a current speaker of a plurality of speakers with a camera, comprising:
   microphone input judgement means for judging existence of microphone inputs into microphones provided for each of the speakers;
   judgement result holding means for holding the results of the judging of the existence of the microphone inputs over a first predetermined period, the first predetermined period being longer than the shortest period of continuous speaking;
   time totaling means for obtaining a total time of the microphone inputs during the first predetermined period from the results of the judging held in said judgement result holding means;
   speaker specifying means for specifying as a current speaker the speaker using the microphone input having the total time obtained by said time totaling means over a second predetermined period, the second predetermined period being a standard continuing period of noise; and
   camera drive means for driving a camera within a shooting range of the speaker specified as the current speaker by said speaker specifying means;

said microphone input judgement means including sampling means for comparing output signals from the microphones with a predetermined level to obtain digital signals representing whether there is an existence of an input into the microphones, and for sampling the digital signals at a predetermined sampling frequency.

4. A television conference system as claimed in claim 3, wherein said judgement result holding means comprises a plurality of storage buffers, provided for the microphones, for holding the digital signals from said sampling means for the first predetermined period.

5. A television conference system as claimed in claim 4, wherein said time totaling means and said speaker specifying means comprises a processing circuit, operatively connected to said storage buffers, for reading the digital signals in said storage buffers, for determining the total time of the microphone input based on the digital signals read, and for specifying the current speaker based on the total time determined.

6. A television conference system as claimed in claim 5, wherein said processing circuit further comprising comparing means for comparing the total time of each of the microphone inputs with the second predetermined period, wherein when the total time exceeds the second predetermined period, the speaker corresponding thereto is specified as the current speaker, and a microphone identifying number corresponding thereto is output.

7. A television conference system as claimed in claim 6, wherein said processing circuit further comprising means to specify as the current speaker the speaker using the microphone having the total time which is greatest among in the total times of all of the microphone inputs.

8. A television conference system as claimed in claim 7, wherein said camera drive means comprises a swivel base control unit, operatively connected to said speaker specifying means, for controlling a power swivel base of the camera in response to the microphone identifying number.

9. A television conference system for automatically shooting a current speaker of a plurality of speakers with a camera, comprising:
   microphone input judgement means for judging existence of microphone inputs into microphones provided for each of the speakers;
   judgement result holding means for holding the results of the judging of the existence of the microphone inputs over a first predetermined period, the first predetermined period being longer than the shortest period of continuous speaking, said judgement result holding means including a plurality of storage buffers, the number of the storage buffers being the same as the number of samplings in the first predetermined period, and the storage buffers being ring shift registers;
   time totaling means for obtaining a total time of the microphone inputs during the first predetermined period from the results of the judging held in said judgement result holding means;
   speaker specifying means for specifying as a current speaker the speaker using the microphone input having the total time obtained by said time totaling means over a second predetermined period, the second predetermined period being a predetermined continuing period of noise; and
   camera drive means for driving a camera within a shooting range of the speaker specified as the current speaker by said speaker specifying means,
   the first predetermined period being approximately four seconds.

10. A television conference system for automatically shooting a current speaker of a plurality of speakers with a camera, comprising:
    microphone input judgement means for judging existence of microphone inputs into microphones provided for each of the speakers;
    judgement result having means for holding the results of the judging of the existence of the microphone inputs over a first predetermined period, the first predetermined period being longer than the shortest period of continuous speaking, said judgement result holding means including a plurality of storage buffers, the number of the storage buffers being the same as the number of samplings in the first predetermined period, and the storage buffers being ring shift registers;
    time totaling means for obtaining a total time of the microphone inputs during the first predetermined period from the results of the judging held in said judgement result holding means;
    speaker specifying means for specifying as a current speaker the speaker using the microphone input having the total time obtained by said time totaling means over a second predetermined period, the second predetermined period being a predetermined continuing period of noise; and
    camera drive means for driving a camera within a shooting range of the speaker specified as the current speaker by said speaker specifying means,
    the second predetermined period being approximately two seconds.

11. A television conference system for transmitting video signals corresponding to picture images from a plurality of television cameras, comprising:
    a plurality of television cameras, said plurality of television cameras including an overview shooting camera for shooting an overview and at least one portion shooting camera for shooting portions within the overview;
    transmission means for transmitting video signals obtained by said plurality of television cameras, said transmission means includes at least selection means for selecting the video signals by dividing each picture's worth of video signals from each of said plurality of television cameras into a plurality of blocks and by switching between the video signals from said overview shooting camera and the video signals from said portion shooting cameras in units of the blocks in accordance with a predetermined transmission ratio;
    reception means for receiving the video signals from said transmission means;
    combining means for combining the video signals into a combined picture image; and
    display means for displaying the combined picture image.

12. A television conference system as claimed in claim 11, wherein the predetermined transmission ratio is a ratio between a first number of the blocks in one pictures worth of the video signals from said overview shooting camera and a second number of the blocks in one pictures worth of the video signals form said portion shooting camera.

13. A television conference system as claimed in claim 11, wherein the predetermined transmission ratio is the ratio between the amount of video signals to be transmitted from said overview shooting camera and the amount of video signals to be transmitted from said portion shooting camera.

14. A television conference system for transmitting video signals corresponding to picture images from a plurality of television cameras, comprising:
- a plurality of television cameras, said plurality of television cameras including an overview shooting camera for shooting an overview and at least one portion shooting camera for shooting portions within the overview;
- transmission means for transmitting video signals obtained by said plurality of television camera, said transmission means includes at least selection means for selecting the video signals by dividing the video signals from each of said plurality of television cameras into a plurality of blocks and by switching between the video signals from said overview shooting camera and the video signals form said portion shooting camera in units of the blocks in accordance with a predetermined transmission ratio;
- reception means for receiving the video signals from said transmission means;
- combining means for combining the video signal into a combined picture image; and
- display means for displaying the combined picture image,
- the predetermined transmission ratio being a ratio between a first number of the blocks in one picture's worth of the video signals from said overview shooting camera and a second number of the blocks in one picture's worth of the video signals from said portion shooting camera;
- said selection means including
  - a selector, operatively connected to said plurality of television cameras, for selecting the video signals to be output in response to a switching signal;
  - an encoding and compressing circuit, operatively connected to said selector, for encoding and compressing each of the blocks of the video signals selected by said selector; and
  - a control unit, operatively connected to said selector and said encoding and compressing circuit, for counting a number of the blocks of the video signals output from said encoding and compressing circuit to provide the switching signal to said selector.

15. A television conference system as claimed in claim 14, wherein said control unit comprises a counter for counting the number of the blocks of the video signals output from said encoding and compressing circuit.

16. A television conference system as claim in claim 15,
- wherein said counter has a preset terminal, and
- wherein said control unit further comprises a setting unit for supplying the predetermined transmission ratio to the preset terminal of said counter.

17. A television conference system as claimed in claim 16, wherein said counter further has a carry signal terminal for outputting a carrier signal when a preset number of blocks, set by said setting unit, is counted, the carrier signal being applied as the switching signal to said selector.

18. A television conference system as claimed in claim 17,
- wherein said system further comprises:
  - a first picture memory for storing the video signals from said overview shooting camera; and
  - a second picture memory for storing the video signals from said portion shooting camera and
- wherein said selecting means selects one of said first and second picture memories to obtain the video signals to be transmitted.

19. A television conference system for transmitting video signals corresponding to picture images from a plurality of television cameras, comprising:
- a plurality of television camera, said plurality of television cameras including an overview shooting camera for shooting an overview and at least one portion shooting camera for shooting portions within the overview;
- transmission means for transmitting video signals obtained by said plurality of television cameras, said transmission means includes at least selection means for selecting the video signals by dividing the video signals from each of said plurality of television cameras into a plurality of blocks and by switching between the video signals from said overview shooting camera and the video signals from said shooting camera in units of the blocks in accordance with a predetermined transmission ratio;
- reception means for receiving the video signals from said transmission means;
- combining means for combining the video signals into a combined picture image; and
- display means for displaying the combined picture image,
- said selection means including
  - first selector means for selecting the video signals from said overview shooting camera and from said portion shooting camera in response to a variably set ratio,
  - encoding and compressing means for encoding and compressing the output video signals selected by said first selector,
  - first buffer memory means, having a data storage amount, for storing the video signals from said portion shooting camera passing through said first selector and said encoding and compressing circuit,
  - second buffer memory means having a data storage amount, for storing the video signals from said portion shooting camera passing through said first selector and said encoding and compressing circuit,
  - second selector means for selecting the outputs of said first and second buffer memory means in bit units and with the predetermined transmission ratio, and
  - control means for controlling said first selector means, said first and second buffer memory means, and said second selector, said control means generates the variably set ratio with reference to the amounts of video signals stored in said first and second buffer memory means in such a way that when the data storage amount in one of said first and second buffer memory means becomes different from that of other of said first and second buffer memory means, the variably set ratio is changed to correct the difference.

20. A television conference system as claimed in claim 19, wherein said control means comprises a conversion table for providing the variably set ratio in response to the data storage amount of the video signals stored in said first and second buffer memory means.

21. A television conference system as claimed in claim 20,
wherein said control means comprises counter means for counting a number of bits of the video signals output from said first or second buffer memory means to generate a switching signal to be applied to said second selector means, and
wherein said second selector means selects the video signal from said first and second buffer memory means in bit units with reference to the predetermined transmission ratio.

22. A television conference system as claimed in claim 21,
wherein said counter has a preset terminal, and
wherein said control means further comprises a setting means for supplying the predetermined transmission ratio to the preset terminal of said counter means.

23. A television conference system as claimed in claim 22, wherein said counter means has a carry signal terminal for outputting a carry signal when a preset number of read clock signals is counted, the carry signal is applied as the switching signal to said second selector.

24. A television conference system as claimed in claim 23, further comprising a first picture memory means for storing the video signals from said overview shooting camera and a second picture memory means for storing the video signals forms aid portion shooting camera, output signals from said first picture memory means and from said second picture memory means are selected by said first selector.

25. A television conference system for automatically shooting a current speaker of a plurality of speakers with a camera, comprising:
microphone input judgement means for judging existence of microphone inputs into microphones provided for each of the speakers;
judgement result holding means for holding the results of the judging of the existence of the microphone inputs over a first predetermined period, the first predetermined period being longer than the shortest period of continuous speaking, said judgement result holding means including a plurality of storage buffers, the number of the storage buffers being the same as the number of samplings in the first predetermined period, and the storage buffers being ring shift registers;
time totaling means for obtaining a total time of the microphone inputs during the first predetermined period from the results of the judging held in said judgement result holding means;
speaker specifying means for specifying as a current speaker the speaker using the microphone input having the total time obtained by said time totaling means over a second predetermined period, the second predetermined period being a predetermined continuing period of noise;
camera drive means for driving a camera within a shooting range of the speaker specified as the current speaker by said speaker specifying means;

an overview shooting camera for shooting an overview of a conference room to obtain overview image data;
a participant shooting camera for shooting a participant in the conference room to obtain participant image data including a first synchronization signal in one picture image data; and
image combining means for combining the overview image data and the participant image data to form combined picture image data, the combined picture image data being transmitted from one conference room to another conference room, said image combining means including at least
memory means for storing the participant image data for at least one picture image,
address designation means for designating an address of said memory means to read the participant image data, the address being made to correspond to the address in a part of a picture image displayed by the combined picture image data by the use of the first synchronization signal so that the participant image data read from said memory means is compacted data, and
switching means having a first input terminal for receiving the overview image data from said overview shooting camera and a second input terminal for receiving the participant image data read from said memory means, for outputting the overview image data when the participant image data is not applied to said second terminal, and for outputting the participant image data by stopping transmission of the overview image data when the participant image data is applied to the second terminal.

26. A television conference system as claimed in claim 25,
wherein the overview image data obtained by said overview shooting camera includes a second synchronization signal indicating a start point of a picture of the overview image data, and
wherein the address designating means comprises at least
synchronization signal extracting means for extracting a vertical synchronization clock signal, a horizontal synchronization clock signal, and a picture element clock signal, from the overview image data;
delay circuit means for delaying the vertical synchronization clock signal for a third predetermined period to produce an output signal;
first counter means for counting the picture element clock signal, the output signal of said delay circuit means being used as a start signal for said first counter means;
second counter means for counting the horizontal synchronization signal, said second counter means having a capacity to count the horizontal synchronization signals of one picture image, the output signal of said delay circuit means being used as a start signal for said second counter means;
first register means for storing contents of said first counter means as a horizontal address of said memory means;
second register means for storing contents of said second counter means as a vertical address of said memory means.

27. A television conference system as claimed in claim 26,
wherein said second counter means produces a stop signal for stopping the counting the said first and second counter means,
wherein said first counter means further generates a control signal during counting of the picture element clock signal, and
wherein when the control signal is supplied to said switching means said switching means selects the participant image data from said memory means.

28. A television conference system for automatically shooting a current speaker of a plurality of speakers with a camera, comprising:
microphone input judgement means for judging existence of microphone inputs into microphones provided for each of the speakers;
judgement result holding means for holding the results of the judging of the existence of the microphone inputs over a first predetermined period, the first predetermined period being longer than the shortest period of continuous speaking, said judgement result holding means including a plurality of storage buffers, the number of the storage buffers being the same as the number of samplings in the first predetermined period, and the storage buffers being ring shift registers;
time totaling means for obtaining a total time of the microphone inputs during the first predetermined period from the results of the judging held in said judgement result holding means;
speaker specifying means for specifying as a current speaker the speaker using the microphone input having the total time obtained by said time totaling means over a second predetermined period, the second predetermined period being a predetermined continuing period of noise; and
camera drive means for driving a camera within a shooting range of the speaker specified as the current speaker by said speaker specifying means,
said microphone input judgement means including speaker detection judgement means for detecting the current speaker to output position information of the current speaker,
the camera being mounted on a swivel base for shooting one of the speakers, and
said system further comprising:
operation control means for providing a control signal for performing manual operation for directing the camera to the current speaker;
swivel base control means for controlling the swivel base in response to an output one of said microphone input judgement means and said operation control means; and
swivel base output judgement means provided between said microphone input judgement means and both said operation control means and said swivel base control means, said swivel base output judgement means forcibly passing the control signal from said operation control means to said swivel base control means prior to passing the position information from said microphone input judgement means to said swivel base control means when the control signal exists, and passing the position information to said swivel base control means only when the control signal does not exist and when the position information presently output is different from the position information previously output.

29. A television conference system as claimed in claim 28, wherein said swivel base output judgement means comprises:
status change detection means for detecting a status change in the outputs of said speaker detection judgement means and said operation control means;
operation content control means for performing the manual operation indicated by said operation control means the status change on the output of said operation control means is detected by said status change detection means;
speaker comparison means for performing a comparison of the speaker information previously detected by said speaker detection judgement means and the speaker information input when a signal from said speaker detection judgement means is detected by said status change detection means;
display content control means for monitoring the output of said operation content control means and for blocking the position information from said microphone input judgement means when said operation content control means is operating; and
speaker content control means for performing control over the signal information from said microphone input judgement means when said operation content control means is not operating.

30. A television conference system for displaying a document picture image of a document and a view picture image of a conference room, comprising:
a moving image camera group for obtaining the view picture image;
a document shooting camera for obtaining the document picture image;
transmission monitor means for displaying a transmission image;
reception monitor means for displaying a reception image; and
an image control means for controlling said transmission monitor means and said reception monitor means, said image control means includes at least
a first changeover switch for switching said moving image camera group in a transmitting conference room in response to a first switching signal from an opposite party conference room; and
a second changeover switch for switching in response to a second switching signal from the transmitting conference room so that the document picture image is displayed on said reception monitor means in the opposite party conference room and on said reception monitor means in the transmitting conference room, and for blocking the image from the opposite party conference room on said reception monitor means in the transmitting conference room,
said image control means being operable to simultaneously display the view picture image and the document picture image on at least one of said transmission monitor means and said reception monitor means.

31. A television conference system as claimed in claim 30, wherein said second changeover switch comprises:
a first contact for passing the document picture image from said document shooting camera to the opposite party conference room; and a second contact for interlocking with said first contact, for selecting the document picture image from said document shooting camera or the reception image as a selected image, and for providing the selected image to said reception monitor means.

32. A method for shooting a current speaker of a plurality of speakers with a camera, each speaker having a microphone, said method comprising the steps of:
   (a) receiving input signals from each of the microphones, the input signals having one or more speech portions, and one or more noise portions within a first predetermined period;
   (b) a totaling the speech portions of each of the input signals over the first predetermined period to produce a time total for each of the input signals;
   (c) comparing the time totals produced in step (b) with a second predetermined period, the second predetermined period being less than the first predetermined period;
   (d) selecting the current speaker as the speaker having the microphone with a corresponding time total greater than the second predetermined period; and
   (e) shooting the current speaker selected in step (d) with the camera.

33. A method as claimed in claim 32, wherein said selecting in step (d) comprises the steps of:
   (d1) identifying the speakers having the microphones with the corresponding time total exceeding the second predetermined period; and
   (d2) determining a current speaker, from the speakers identified in step (d2), as the speaker with the largest time total.

* * * * *

UNITED STATES PATENT AND TRADEMARK OFFICE
CERTIFICATE OF CORRECTION

PATENT NO. : 5,206,721
DATED : April 27, 1993
INVENTOR(S) : Youichi ASHIDA et al.

It is certified that error appears in the above-indentified patent and that said Letters Patent is hereby corrected as shown below:

Cover Page [75] Inventors:  "Inagi" should be --Tokyo--.

Signed and Sealed this

Eighteenth Day of January, 1994

Attest:

BRUCE LEHMAN

Attesting Officer — Commissioner of Patents and Trademarks